US012325357B2

United States Patent
Miller et al.

(10) Patent No.: US 12,325,357 B2
(45) Date of Patent: *Jun. 10, 2025

(54) VEHICULAR INTERIOR CABIN MONITORING SYSTEM

(71) Applicant: Magna Electronics Inc., Auburn Hills, MI (US)

(72) Inventors: Patrick A. Miller, Grand Blanc, MI (US); Yuesheng Lu, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,234

(22) Filed: Jul. 22, 2024

(65) Prior Publication Data

US 2024/0375587 A1 Nov. 14, 2024

Related U.S. Application Data

(63) Continuation of application No. 18/509,400, filed on Nov. 15, 2023, now Pat. No. 12,043,176, which is a (Continued)

(51) Int. Cl.
*B60R 1/04* (2006.01)
*B60Q 3/258* (2017.01)
(Continued)

(52) U.S. Cl.
CPC ............... *B60R 1/04* (2013.01); *B60Q 3/258* (2017.02); *B60R 1/12* (2013.01);
(Continued)

(58) Field of Classification Search
CPC ..... B60R 1/04; B60R 1/12; B60R 2001/1223; B60R 2001/1253; B60R 2011/0033; B60Q 3/258
See application file for complete search history.

(56) References Cited

U.S. PATENT DOCUMENTS 5,550,677 A  8/1996  Schofield et al.
5,567,360 A  10/1996  Varaprasad et al.
(Continued)

FOREIGN PATENT DOCUMENTS

CN  205523966 U  8/2016
CN  209534893 U  10/2019
(Continued)

OTHER PUBLICATIONS

International Search Report and Written Opinion dated Dec. 15, 2022, from corresponding PCT Patent Application No. PCT/US2022/075887.

(Continued)

*Primary Examiner* — Matthew J. Peerce
(74) *Attorney, Agent, or Firm* — HONIGMAN LLP

(57) ABSTRACT

A vehicular interior cabin monitoring system includes an interior rearview mirror assembly with a mirror head that accommodates a camera and a plurality of sets of light sources. The system includes a plurality of electronic switches. Each of the electronic switches (i) is connected in parallel across a respective set of light sources and (ii) is connected in series with at least one other set of light sources when at least one other electronic switch operates in its opened state. With each electronic switch operating in its respective opened state, electrical current provided by the current driver passes through the individual light sources of the plurality of sets of lights sources. The system is (i) operable to provide an occupant detection function for detecting an occupant present within an interior cabin of the vehicle and (ii) operable to provide a driver monitoring function for monitoring a driver of the vehicle.

39 Claims, 9 Drawing Sheets

Related U.S. Application Data continuation of application No. 18/246,350, filed as application No. PCT/US2022/075887 on Sep. 2, 2022, now Pat. No. 11,827,153.

(60) Provisional application No. 63/260,884, filed on Sep. 3, 2021.

(51) Int. Cl.
  *B60R 1/12* (2006.01)
  *B60R 11/00* (2006.01)

(52) U.S. Cl.
  CPC .............. *B60R 2001/1223* (2013.01); *B60R 2001/1253* (2013.01); *B60R 2011/0033* (2013.01)

(56) References Cited

U.S. PATENT DOCUMENTS

| | | | |
|---|---|---|---|
| 5,570,127 A | 10/1996 | Schmidt | |
| 5,670,935 A | 9/1997 | Schofield et al. | |
| 5,760,962 A | 6/1998 | Schofield et al. | |
| 5,796,094 A | 8/1998 | Schofield et al. | |
| 5,877,897 A | 3/1999 | Schofield et al. | |
| 5,949,331 A | 9/1999 | Schofield et al. | |
| 6,097,023 A | 8/2000 | Schofield et al. | |
| 6,158,655 A | 12/2000 | DeVries, Jr. et al. | |
| 6,483,438 B2 | 11/2002 | DeLine et al. | |
| 6,552,342 B2 | 4/2003 | Holz et al. | |
| 6,593,565 B2 | 7/2003 | Heslin et al. | |
| 6,627,918 B2 | 9/2003 | Getz et al. | |
| 6,690,268 B2 | 2/2004 | Schofield et al. | |
| 6,703,925 B2 | 3/2004 | Steffel | |
| 6,824,281 B2 | 11/2004 | Schofield et al. | |
| 6,959,994 B2 * | 11/2005 | Fujikawa | B60R 1/25 348/148 |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,338,177 B2 | 3/2008 | Lynam | |
| 7,360,932 B2 | 4/2008 | Uken et al. | |
| 7,420,756 B2 | 9/2008 | Lynam | |
| 7,477,758 B2 | 1/2009 | Piirainen et al. | |
| 7,480,149 B2 | 1/2009 | DeWard et al. | |
| 7,626,749 B2 | 12/2009 | Baur et al. | |
| 7,720,580 B2 | 5/2010 | Higgins-Luthman | |
| 7,855,755 B2 | 12/2010 | Weller et al. | |
| 7,914,187 B2 | 3/2011 | Higgins-Luthman et al. | |
| 8,049,640 B2 | 11/2011 | Uken et al. | |
| 8,258,932 B2 | 9/2012 | Wahlstrom | |
| 8,446,470 B2 | 5/2013 | Lu et al. | |
| 8,451,107 B2 | 5/2013 | Lu et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 8,743,203 B2 | 6/2014 | Karner et al. | |
| 8,876,342 B2 | 11/2014 | Wimbert et al. | |
| 8,922,422 B2 | 12/2014 | Klar et al. | |
| 9,090,213 B2 | 7/2015 | Lawlor et al. | |
| 9,126,525 B2 | 9/2015 | Lynam et al. | |
| 9,174,578 B2 | 11/2015 | Uken et al. | |
| 9,280,202 B2 | 3/2016 | Gieseke et al. | |
| 9,346,403 B2 | 5/2016 | Uken et al. | |
| 9,405,120 B2 | 8/2016 | Graf et al. | |
| 9,487,159 B2 | 11/2016 | Achenbach | |
| 9,493,122 B2 | 11/2016 | Krebs | |
| 9,598,016 B2 | 3/2017 | Blank et al. | |
| 9,609,757 B2 | 3/2017 | Steigerwald | |
| 9,701,258 B2 | 7/2017 | Tiryaki | |
| 9,827,913 B2 | 11/2017 | De Wind et al. | |
| 9,878,669 B2 | 1/2018 | Kendall | |
| 9,900,490 B2 | 2/2018 | Ihlenburg et al. | |
| 10,017,114 B2 | 7/2018 | Bongwald | |
| 10,029,614 B2 | 7/2018 | Larson | |
| 10,046,706 B2 | 8/2018 | Larson et al. | |
| 10,065,574 B2 | 9/2018 | Tiryaki | |
| 10,166,924 B2 | 1/2019 | Baur | |
| 10,166,926 B2 | 1/2019 | Krebs et al. | |
| 10,247,941 B2 | 4/2019 | Fursich | |
| 10,261,648 B2 | 4/2019 | Uken et al. | |
| 10,315,573 B2 | 6/2019 | Bongwald | |
| 10,421,404 B2 | 9/2019 | Larson et al. | |
| 10,442,360 B2 | 10/2019 | LaCross et al. | |
| 10,466,563 B2 | 11/2019 | Kendall et al. | |
| 10,567,633 B2 | 2/2020 | Ihlenburg et al. | |
| 10,567,705 B2 | 2/2020 | Ziegenspeck et al. | |
| 10,703,204 B2 | 7/2020 | Hassan et al. | |
| 10,769,434 B2 | 9/2020 | Weller et al. | |
| 10,906,463 B2 | 2/2021 | Pflug et al. | |
| 10,908,417 B2 | 2/2021 | Fürsich | |
| 10,922,563 B2 | 2/2021 | Nix et al. | |
| 10,946,798 B2 | 3/2021 | Fürsich et al. | |
| 10,958,830 B2 | 3/2021 | Koravadi | |
| 11,007,935 B2 * | 5/2021 | Lintz | G06F 3/1423 |
| 11,167,771 B2 | 11/2021 | Caron et al. | |
| 11,205,083 B2 | 12/2021 | Lynam | |
| 11,214,199 B2 | 1/2022 | LaCross et al. | |
| 11,240,427 B2 | 2/2022 | Koravadi | |
| 11,242,008 B2 | 2/2022 | Blank et al. | |
| 11,252,376 B2 | 2/2022 | Ihlenburg | |
| 11,341,671 B2 | 5/2022 | Lu et al. | |
| 11,348,374 B2 | 5/2022 | Kramer et al. | |
| 11,433,906 B2 | 9/2022 | Lu | |
| 11,465,561 B2 | 10/2022 | Peterson et al. | |
| 11,488,399 B2 | 11/2022 | Wacquant | |
| 11,493,918 B2 | 11/2022 | Singh | |
| 11,518,401 B2 | 12/2022 | Kulkarni | |
| 11,582,425 B2 | 2/2023 | Liu | |
| 11,691,567 B2 | 7/2023 | Huizen et al. | |
| 11,827,153 B2 * | 11/2023 | Miller | H05B 45/48 |
| 12,043,176 B2 * | 7/2024 | Miller | B60R 1/04 |
| 2001/0022550 A1 | 9/2001 | Steffel | |
| 2002/0005999 A1 | 1/2002 | Hutzel et al. | |
| 2002/0024713 A1 | 2/2002 | Roberts et al. | |
| 2004/0252993 A1 | 12/2004 | Sato | |
| 2006/0050018 A1 | 3/2006 | Hutzel et al. | |
| 2007/0182528 A1 | 8/2007 | Breed et al. | |
| 2008/0310005 A1 | 12/2008 | Tonar et al. | |
| 2009/0040778 A1 | 2/2009 | Takayanagi et al. | |
| 2009/0135493 A1 | 5/2009 | Takayanagi et al. | |
| 2010/0085653 A1 | 4/2010 | Uken et al. | |
| 2011/0080481 A1 | 4/2011 | Bellingham | |
| 2011/0188122 A1 | 8/2011 | Habibi et al. | |
| 2012/0236136 A1 | 9/2012 | Boddy | |
| 2014/0022390 A1 | 1/2014 | Blank et al. | |
| 2014/0285666 A1 | 9/2014 | O'Connell et al. | |
| 2014/0293169 A1 | 10/2014 | Uken et al. | |
| 2014/0313563 A1 | 10/2014 | Uken et al. | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0097955 A1 | 4/2015 | De Wind et al. | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2016/0221509 A1 | 8/2016 | Takada et al. | |
| 2017/0217367 A1 | 8/2017 | Pflug et al. | |
| 2017/0237946 A1 | 8/2017 | Schofield et al. | |
| 2017/0274906 A1 | 9/2017 | Hassan et al. | |
| 2017/0355312 A1 | 12/2017 | Habibi et al. | |
| 2018/0134217 A1 | 5/2018 | Peterson et al. | |
| 2018/0222414 A1 | 8/2018 | Ihlenburg et al. | |
| 2018/0231976 A1 | 8/2018 | Singh | |

(56) References Cited

U.S. PATENT DOCUMENTS

| | | |
|---|---|---|
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 | 6/2019 | Lintz et al. |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0229309 A1 | 7/2022 | Laskin et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |
| 2023/0302994 A1 | 9/2023 | Miller et al. |
| 2024/0017610 A1 | 1/2024 | Ravichandran et al. |
| 2024/0064274 A1 | 2/2024 | Blank et al. |

FOREIGN PATENT DOCUMENTS

| | | |
|---|---|---|
| DE | 10325646 A1 | 1/2004 |
| DE | 102005000650 A1 | 7/2006 |
| FR | 3071788 A1 | 4/2019 |
| JP | 2004136760 A | 5/2004 |
| WO | 2022150826 A1 | 7/2022 |
| WO | 2022187805 A1 | 9/2022 |
| WO | 2022241423 A1 | 11/2022 |

OTHER PUBLICATIONS

Seeing Machines' FOVIO Driver Monitoring (FDM) processor [description of which is available at https://china.xilinx.com/publications/presentations/c_D3_03-Driver-Monitoring-Systems.pdf], Jan. 14, 2021.

\* cited by examiner

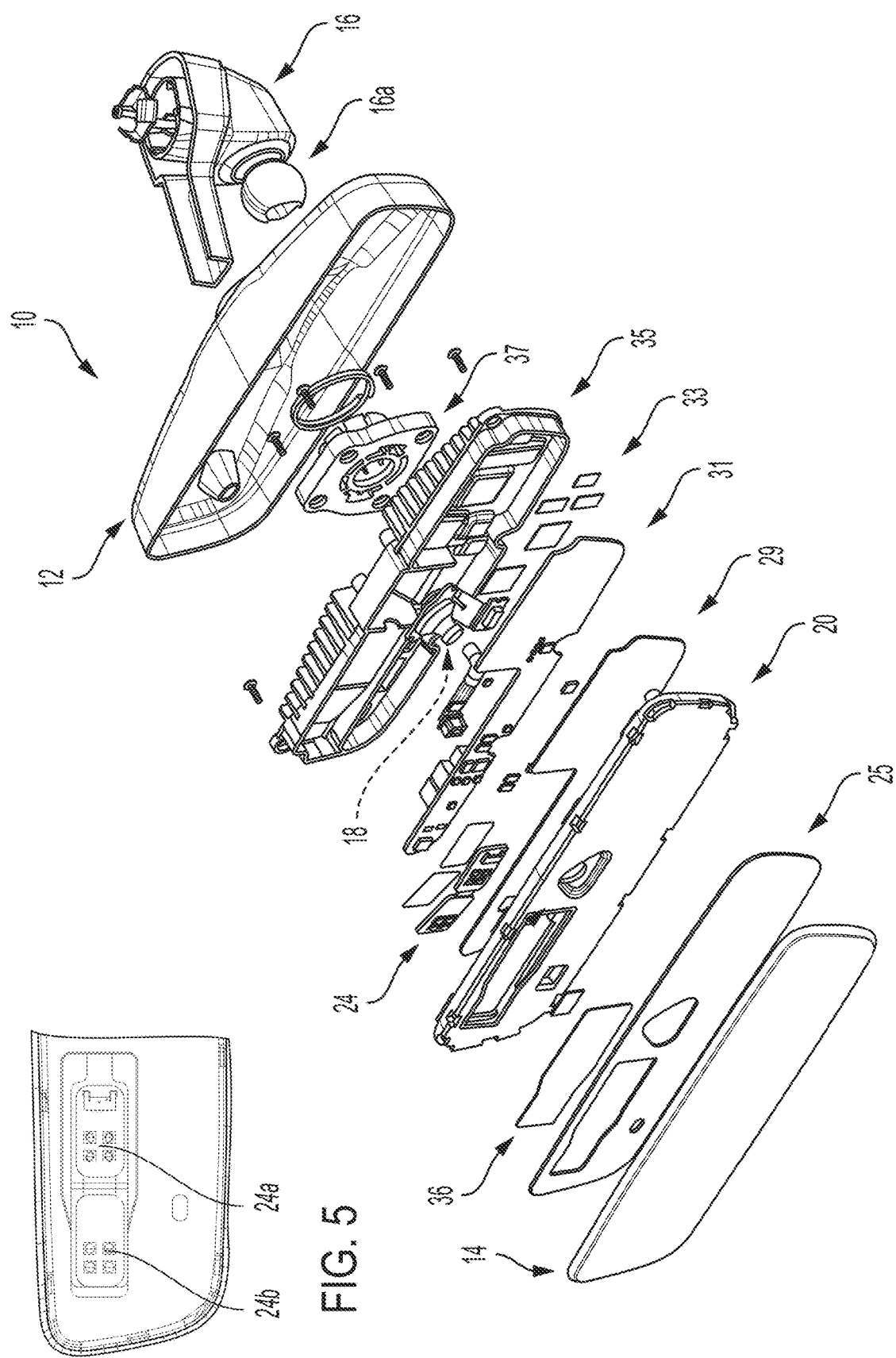

VEHICULAR INTERIOR CABIN MONITORING SYSTEM

CROSS REFERENCE TO RELATED APPLICATIONS

The present application is a continuation of U.S. patent application Ser. No. 18/509,400, filed Nov. 15, 2023, now U.S. Pat. No. 12,043,176, which is a continuation of U.S. patent application Ser. No. 18/246,350, filed Mar. 23, 2023, now U.S. Pat. No. 11,827,153, which is a 371 U.S. National Stage filing of PCT Application No. PCT/US2022/075887, filed Sep. 2, 2022, which claims the filing benefits of U.S. provisional application Ser. No. 63/260,884, filed Sep. 3, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A cabin monitoring system or driving assistance system or vision system or imaging system for a vehicle utilizes one or more cameras (preferably one or more CMOS cameras) to capture image data. The system may include a mirror head adjustably attached at a mounting structure or base. The mounting structure is configured to attach at an interior portion of a vehicle. A camera is accommodated by the mirror head. A plurality of light emitting diodes (LEDs) is accommodated by the mirror head. The plurality of LEDs are connected in series with each other. The system includes a current driver that is configured to provide current to the plurality of LEDs. The system includes a switch that has an open state and a closed state. When the switch is in the open state, current provided by the current driver passes through each of the plurality of LEDs. When the switch is in the closed state, current provided by the current driver passes through a first portion or set or subset of the plurality of LEDs and bypasses a second portion or set or subset of the LEDs. The first portion of the LEDs is different than the second portion of LEDs. The system also includes an electronic control unit (ECU) that includes electronic circuitry and associated software. The electronic circuitry of the ECU includes an image processor for processing image data captured by the camera. The ECU places the switch into the open state when the camera captures image data for a first vehicular function. The ECU places the switch into the closed state when the camera captures image data for a second vehicular function.

These and other objects, advantages, purposes and features of the present invention will become apparent upon review of the following specification in conjunction with the drawings.

BRIEF DESCRIPTION OF THE DRAWINGS

FIG. 4 is an exploded perspective view of the interior rearview mirror assembly;

FIG. 5 is a plan view of the portion of the mirror head that accommodates the near infrared light emitters, with the near infrared light emitters comprising narrow beam emitters and wider beam emitters;

DESCRIPTION OF THE PREFERRED EMBODIMENTS

A vehicle vision system and/or driver or driving assist system and/or lighting system and/or driver or occupant monitoring system operates to capture images interior and/or exterior of the vehicle and may process the captured image data to display images and to detect objects at or near or within the vehicle to assist a driver or other occupants of the vehicle. The vision system includes an image processor or image processing system that is operable to receive image data from one or more cameras and may provide an output to a display device for displaying images representative of the captured image data. Optionally, the vision system may provide display, such as a rearview display or a top down or bird's eye or surround view display or the like.

Figure 1:
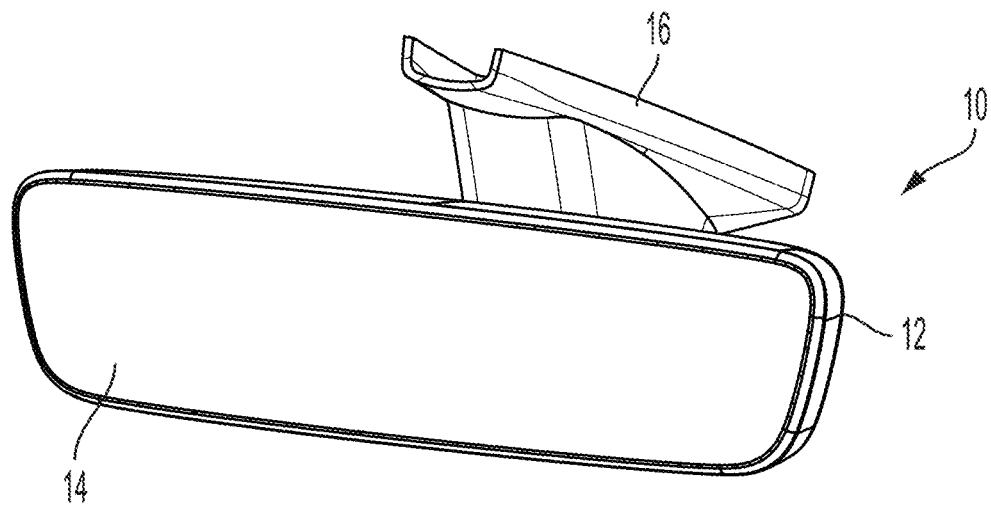
FIG. 1 is a perspective view of an interior rearview mirror assembly having a driver monitoring camera and a near infrared light emitter behind a reflective element of the interior rearview mirror assembly.

Referring now to the drawings and the illustrative embodiments depicted therein, in some implementations, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element may comprise a variable reflectance mirror reflective element that varies its reflectance responsive to electrical current applied to conductive coatings or layers of the reflective element.

Figure 2:
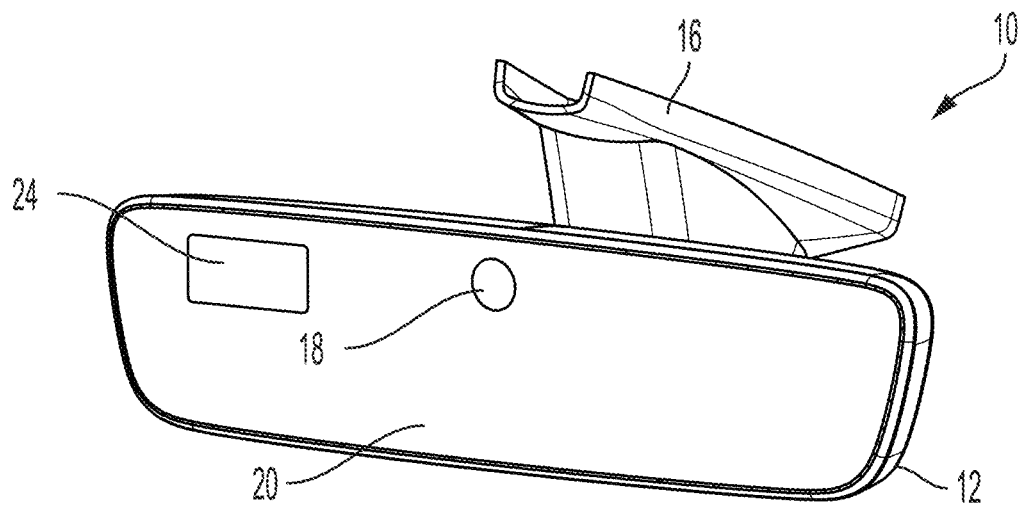
FIG. 2 is another perspective view of the interior rearview mirror assembly, showing the driver monitoring camera and light emitters without the reflective element.

The mirror assembly 10 includes or is associated with a driver monitoring system (DMS), with the mirror assembly comprising a driver/occupant monitoring camera 18 disposed at a back plate 20 (and viewing through an aperture of the back plate) behind the reflective element 14 and viewing through the reflective element toward at least a head region of the driver of the vehicle (FIG. 2). The DMS includes one or more infrared (IR) or near infrared (NIR) light emitter(s) 24, which may be disposed at the back plate 20 and may light through another aperture of the back plate and through the reflective element.

The mirror assembly 10 includes a printed circuit board (PCB) having a control or control unit comprising electronic circuitry (e.g., disposed at the circuit board or substrate in the mirror casing), which includes driver circuitry for controlling dimming of the mirror reflective element. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera 18 and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

The mirror assembly may also include one or more light emitters (such as IR or NIR light emitting diodes (LEDs) or vertical-cavity surface-emitting lasers (VCSEL) or the like) disposed at the back plate 20 behind the reflective element 14 and emitting near infrared light (or other nonvisible light) through the aperture of the back plate and through the reflective element toward the head region of the driver of the vehicle.

The driver monitoring system and the mirror assembly and NIR emitters and camera may utilize aspects of the driver monitoring systems and mirror assemblies and NIR emitters and cameras described in International PCT Application No. PCT/US2022/072238, filed May 11, 2022 and published as WO 2022/241423, and/or PCT Application No. PCT/US2022/070882, filed Mar. 1, 2022 and published as WO 2022/187805, which are hereby incorporated herein by reference in their entireties.

The interior rearview mirror thus may include embedded cameras, IR/NIR illuminators and one or more processors for processing captured image data for the driver monitoring application. The inward facing camera 18 and light emitters 24 may be fixed within the mirror head, and thus both components may be coupled with the mirror body. In these cases, the camera's field of view is subject to change from driver to driver as the mirror head is adjusted to set the driver's preferred rearward view. Optionally, the camera and light emitters may be disposed at the fixed (non-adjusting) mounting structure of the mirror assembly or may be disposed elsewhere in the cabin of the vehicle.

Cameras, such as a camera located at the interior rearview mirror (e.g., the camera 18), are often used for multiple functions. For example, a camera may capture image data for driver monitoring system in addition to capturing image data for an occupant monitoring system. However, these different functionalities may have different lighting needs or requirements. For example, the functions may require different intensities of light, light directed in different directions, different frequencies of light, etc. Conventional systems may provide separate systems with redundant hardware to enable both functions, which increases costs.

Figure 3:
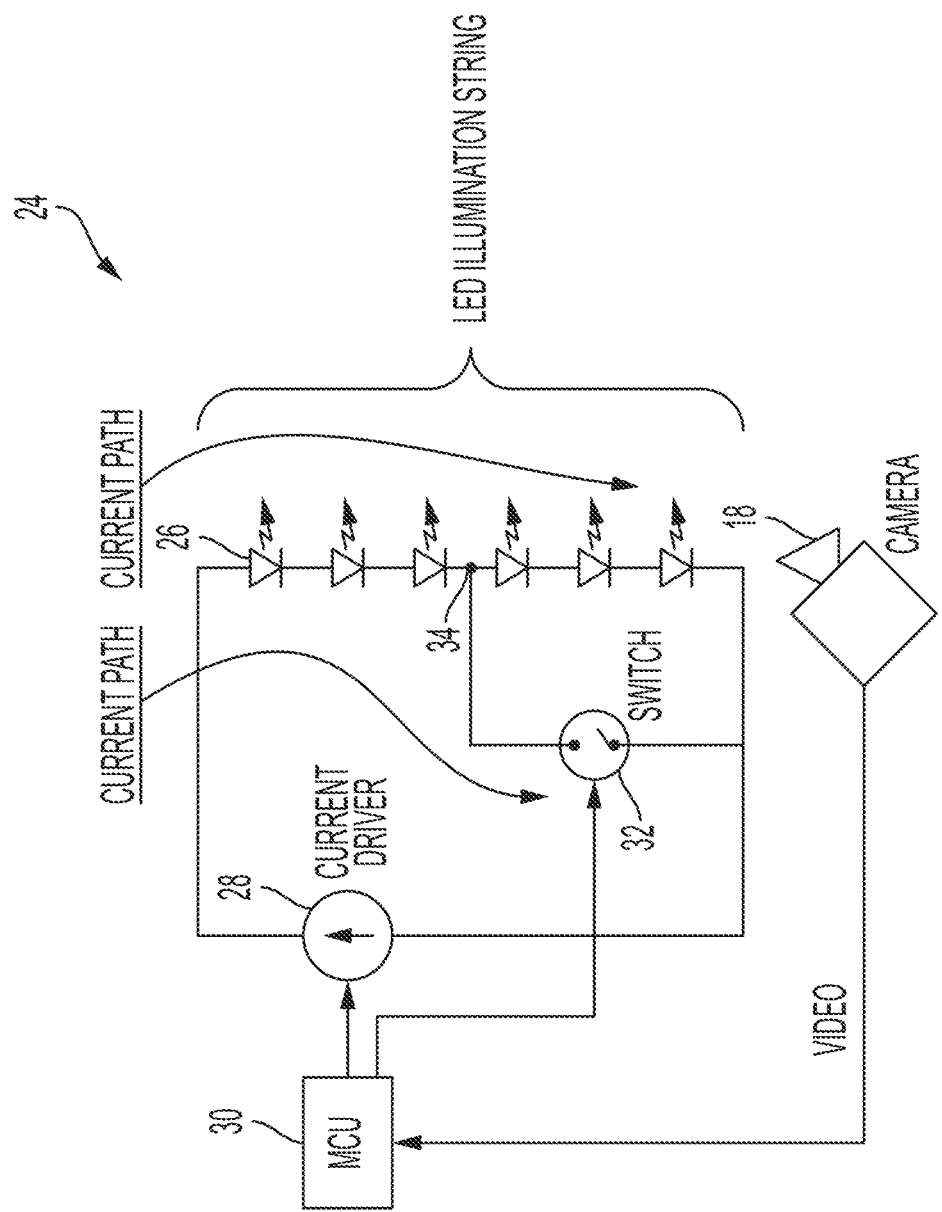
FIG. 3 is a schematic view of a lighting system of the assembly of FIG. 1.

Referring now to FIG. 3, the light emitters 24 may include a plurality of LEDs (e.g., one or more IR LEDs and/or one or more NIR LEDs) disposed at, for example, the PCB. In this example, there are six LEDs in series, but the light emitters may include any number of LEDs 26. The LEDs 26 are powered by a current driver 28 that supplies the LEDs 26 with current. When the current driver 28 provides current to the LEDs 26, the LEDs emit light (e.g., IR light, NIR light, visible light, UV light, etc.). A controller 30, such as an ECU or MCU or other processor, controls the current driver 28 (i.e., adjusts the amount of current the current driver 28 provides). The ECU 30 may enable/disable the current driver 28 and thus enable/disable the LEDs 26 (i.e., by stopping or reducing the amount of current provided to the LEDs 26). The ECU 30 may control an intensity or brightness of the light emitted by the LEDs 26 by adjusting the amount of current provided by the current driver 28.

The system also includes at least one switch 32. The switch may be any electrical/electronic switch (e.g., a solid state switch), such as a metal-oxide-semiconductor field-effect transistor (MOSFET), a bipolar transistor, a power diode, etc., controlled by the ECU 30. The switch 32 allows current to bypass one or more of the LEDs 26. Here, the switch 32 connects a point 34 between the third and the fourth LED 26 to the return (e.g., ground). When the switch 32 is closed, current will flow through the first, second, and third LEDs and will bypass the fourth, fifth, and sixth LEDs. In this way, the ECU 30 can open the switch 32 to provide current to the entire bank of LEDs 26 such that all six LEDs emit light (because with the switch open, none of the LEDs 26 are bypassed) or the ECU 30 can close the switch 32 to provide current to only the first three LEDs (and bypassing the last three LEDs 26). Thus, the ECU 30 operates the switch 32 to quickly and easily control an amount of light (and optionally direction of light or type or color of light) emitted by the bank of LEDs 26.

For example, if a first function (e.g., an OMS function) requires illumination from all six LEDs 26, the ECU 30 may ensure the switch 32 is open when the camera 18 captures frames of image data for the first function. The ECU 30 may synchronize the LED illumination with the camera such that the LEDs only emit light when the camera is capturing a frame of image data that is to be used by the corresponding function or system (e.g., the OMS). A second function (e.g., a DMS function) may require less illumination (or illumination of a different region) than the first function. For example, the second function may only require illumination from three of the LEDs 26 (e.g., because only the driver instead of all of the occupants of the vehicle is to be illuminated). The ECU 30 may ensure that the switch 32 is closed when the camera 18 captures frames of image data for the second function. For example, the system may alternate capturing frames of image data for the OMS function and the DMS function, and the ECU 30 may accordingly open and close the switch 32 to driver the corresponding LEDs 24 during the capture of each frame of image data. Optionally, the ECU 30 may disable all of the LEDs 24 (e.g., via the current driver 28) in between capturing frames of image data.

The ECU 30 may control the current to different LEDs 26 via the switch 32 for purposes in addition to or different than intensity. For example, one or more LEDs 26 may be angled in different directions (e.g., more toward a particular occupant of the vehicle or more toward a particular region of the vehicle), thus emitting light in different directions, or some of the LEDs may emit different types of light, such as some LEDs emitting visible light and other LEDs emitting NIR light. The ECU 30 may control the direction or type of light emitted by controlling the switch 32.

Optionally, the switch 32 is electrically connected in series with a first group or portion or set or subset of the LEDs 26 (the first three LEDs in this example) and is connected in parallel with a second group or portion or set or subset of LEDs 26 (the last three LEDs in this example). Because the switch 32 is in series with the first or set or subset of LEDs, current passes through the first portion of LEDs 26. Because the switch 32 is in parallel with the second or set or subset of LEDs 26 and the switch provides a path of less resistance than the LEDs 26, the current will bypass the second or set or subset of LEDs 26 by instead passing through the closed switch 32.

The system may include any number of LEDs 26 and any number of switches 32. Multiple switches may allow the ECU fine control over which LEDs 26 are provided current and which LEDs are bypassed through the use of a single current driver 28. In the example of FIG. 3, the system could include a second switch 32 to enable bypassing of one LED, two LEDs, four LEDs, and five LEDs (i.e., based on where along the string of LEDs 26 the switch connects). The ECU 30 may operate each switch 32 independently to provide fine control over the intensity and/or direction and/or types of light emitted.

The ECU 30 may energize different LEDs for different functions when the camera 30 captures image data. For example, the camera 30 may run at a fixed rate (e.g., 30 frames per second), and a portion of the frames captured may be for one function while a different portion of the frames captured may be for a different function. The ECU 30 may synchronize operation of the switch(es) 32 with operation of the camera such that the appropriate LEDs 26 are enabled depending on the function in use when the camera 18 captures a frame of image data.

The system may include aspects of driver monitoring systems or occupant monitoring systems described in U.S. patent application Ser. No. 17/663,462, filed May 16, 2022, and/or International PCT Application No. PCT/US2022/072238, filed May 11, 2022 and published as WO 2022/241423, and/or PCT Application No. PCT/US2022/070882, filed Mar. 1, 2022 and published as WO 2022/187805, which are all hereby incorporated herein by reference in their entireties.

Thus, the vision system described herein allows an ECU or other controller/processor to bypass one or more LEDs (or other illumination sources) using one or more switches. This allows the ECU to control which LEDs are illuminated via the switches and allow the system to capture image data for different functions with different lighting requirements with the use of only a single camera, controller, and current driver. The system may reduce the number of illumination sources required (e.g., by reducing redundancies) While examples herein describe a camera included in a interior rearview mirror and IR/NIR LEDs for features such as OMS and DMS, the vision system may apply to any cameras, such as other interior cameras or exterior cameras (e.g., for object detection exterior of the vehicle) and for any type of illumination source, such as LEDs (e.g., LEDs that emit IR light, visible light, UV light, etc.).

The mirror assembly includes or is associated with a driver monitoring system (DMS), with the mirror assembly comprising the driver/occupant monitoring camera 18 disposed at a back plate 20 (and viewing through an aperture of the back plate) behind the reflective element 14 and viewing through the reflective element toward at least a head region of the driver of the vehicle. The DMS includes a near infrared light emitter 24 (or other nonvisible light emitter, such as an infrared light emitter) disposed at the back plate 20 and emitting light through another aperture of the back plate and through the reflective element.

With the DMS camera disposed in the mirror head, the camera moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver aligns the mirror to view rearward, the camera is aligned with the line of sight of the driver. The location of the DMS camera and IR LED(s) at the mirror head provides an unobstructed view to the driver. The DMS preferably is self-contained in the interior rearview mirror assembly and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring camera may also provide captured image data for an occupancy monitoring system (OMS) or another separate camera may be disposed at the mirror assembly for the OMS function.

As shown in FIG. 4, the mirror assembly includes a printed circuit board (PCB) 31 having a control or control unit comprising electronic circuitry (disposed at the circuit board or substrate in the mirror casing), which includes driver circuitry for controlling dimming of the mirror reflective element. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

The mirror assembly may also include one or more infrared (IR) or near infrared light emitters 24 (such as IR or near-IR light emitting diodes (LEDs) or vertical-cavity surface-emitting lasers (VCSEL) or the like) disposed at the back plate 20 behind the reflective element 14 and emitting near infrared light through the aperture of the back plate and through the reflective element toward the head region of the driver of the vehicle. As shown in FIG. 5, the IR emitter device 24 comprises an IR emitter or LED printed circuit board, with a first set of near infrared light emitting diodes 24a (e.g., a set of wider beam LEDs) at one part of the LED PCB and a second set of near infrared light emitting diodes 24b (e.g., a set of narrower beam LEDs) at another part of the LED PCB. The LED PCB has one part angled relative to the other part to emit light in a desired direction depending on the orientation of the mirror head. Thus, the first set of near infrared light emitting diodes may be angled toward the left side of the vehicle so as to be directed toward a driver of a left hand drive vehicle (if the mirror assembly is installed in a left hand drive vehicle and the first set of near infrared light emitting diodes are enabled for the driver monitoring function), while the second set of near infrared light emitting diodes may be angled toward the right side of the vehicle so as to be directed toward a driver of a right hand drive vehicle (if the mirror assembly is installed in a right hand drive vehicle and the second set of near infrared light emitting diodes are enabled for the driver monitoring function).

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/ driver-monitoring-systems-ford-gm-earn-points-in-cr-tests-a6530426322) are "Two-Box" DMS in that (i) the camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze captured image data to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

A "One-Box" DMS electrochromic interior rearview mirror assembly has both the camera used to monitor the driver's head/eyes and the near-IR emitting light sources that illuminate the driver's head/eyes accommodated by an interior rearview mirror assembly (and preferably, are both accommodated within the mirror head of the interior rearview mirror assembly). Thus, the one-box DMS electrochromic interior rearview mirror assembly allows an original equipment manufacturer (OEM) of vehicles (such as for example VW or Toyota or Honda or GM or Ford) to equip vehicles with the likes of a DMS interior rearview electrochromic mirror assembly that includes the camera/illumination sources/driver monitoring software/associated driver monitoring electronic circuitry such as data processing chip (s), memory, electronic components, printed circuit board(s) that includes automatic dimming circuitry, data processing chip(s), memory, electronic components, light sensors for detecting glare and ambient lighting, and that includes power supplies, electrical connector(s), heat sink(s), mechanical parts, etc. The One-Box Interior DMS Rearview Mirror Assembly thus can be purchased by an OEM from an interior rearview mirror assembly manufacturer and can be installed by that OEM into a being-assembled vehicle (typically mounting to a mirror mounting button or similar element that is adhered to the in-cabin side of the windshield of the vehicle). To operate in the equipped vehicle, the One-Box Interior DMS Rearview Mirror Assembly connects to a vehicle wiring harness of the vehicle and is supplied via this vehicle wiring harness with ignition voltage (nominal 12V DC but can vary from 9V (6V for automatic stop/start) to 16V or so depending on the vehicle type and the operating condition of the vehicle). The one-box Interior DMS rearview mirror assembly via this wiring harness is supplied with vehicle data, such data including vehicle and other data supplied via a CAN bus or link (that can carry to the mirror vehicle information and that can carry from the mirror distraction alerts, etc.) or supplied via a Local Area Network (LIN) bus or line.

The interior DMS rearview mirror assembly provides a stand-alone One-Box DMS solution that has the camera/illumination near-IR sources/DMS software and its associated data processing chip(s)/automatic dimming circuitry/circuitry used to control an exterior electrochromic mirror reflective element that is part of an exterior sideview mirror of the equipped vehicle/data processing circuitry/communication circuitry/memory/power supplies/associated electronics and hardware/heat sinks, etc. packaged into, integrated into and accommodated by a vehicular interior rearview mirror assembly, and preferably covertly integrated within the mirror head of the vehicular interior rearview mirror assembly behind (and rendered covert to a driver's view by) a transflective mirror reflective element of the vehicular interior rearview mirror assembly.

The interior rearview mirror thus has embedded cameras, IR illuminators and the processor for processing captured image data for the driver monitoring application. The inward facing camera 18 and IR illuminators 24 are fixed within the mirror head, and thus both components are coupled with the mirror body. Hence, the camera's field of view is subject to change from driver to driver as the mirror head is adjusted to set the driver's preferred rearward view.

In the illustrated embodiment, the camera and light emitters are disposed behind the mirror reflective element, which may comprise an electro-optic (such as electrochromic or EC) mirror reflective element or a prismatic mirror reflective element. The mirror casing may include a plastic bezel portion that circumscribes the perimeter edge of the mirror reflective element and that provides an outer curved surface that transitions from the outer surface of the mirror casing to the planar front surface of the mirror reflective element (optionally with no part of the plastic bezel portion overlapping or overlaying onto the planar front surface of the mirror reflective element), such that the plastic bezel completes the homologated edge. Optionally, the mirror reflective element may provide an exposed outer curved surface that transitions from the outer surface of the mirror casing to the planar front surface of the mirror reflective element.

As shown in FIG. 4, the mirror back plate 20 is adhered at the rear of the mirror reflective element 14 (such as via an adhesive foam tape 25). A heat spreader 29 (e.g., a thin aluminum plate) may be disposed at the rear of the back plate, and the printed circuit board (PCB) 31 may attach at the rear of the heat spreader. A heat sink/chassis and EMI form in place (FIP) gasket is disposed at the rear of the printed circuit board and is configured to attach at the pivot element 37 (shown as a socket element) that pivotally attaches at the ball member 16a of the mirror mount 16. Thermal interface material 33 may be disposed between the circuit board 31 and the chassis 35 to enhance heat dissipation from the circuit board to the chassis and heat sink.

Optionally, the mirror back plate or attachment plate may be molded out of a metal filled injection moldable material (e.g., Stainless Steel (SS) fiber, such as a polycarbonate (PC) Acrylonitrile butadiene styrene (ABS) and SS fiber material) to provide electromagnetic interference (EMI) mitigation (EMC shield). Optionally, the heatsink may be formed via additive manufacturing (3D printing or the like) to provide an additive manufactured heatsink with capillary effect to help transfer heat more uniformly and away from high power components.

The near infrared light emitter 24 includes a circuit board or element 25 that is attached at the chassis 35 via a thermal adhesive, and is disposed at the aperture of the back plate, with an IR longpass filter 36 disposed between the reflective element and the near IR light emitter. The near IR light emitter 24 is disposed at a left side of the mirror head (as viewed by a driver of the vehicle with the mirror head installed at the vehicle) and is configured to illuminate the driver's head region of a left hand drive vehicle.

In the illustrated embodiment, the light emitter 24 has two sets of LEDs disposed on the circuit board. One set of LEDs 24a emits a wider beam of near infrared light when energized (e.g., four wider beam LEDs) and another set of LEDs 24b emits a narrower beam of near infrared light when energized (e.g., four narrower beam LEDs). The narrower beam LEDs may be powered or energized for the driver monitoring function, while the wider beam LEDs may be powered or energized for the occupant monitoring function (and may be episodically energized for illuminating particular frames of captured image data, such as by utilizing aspects of the systems described in International PCT Application No. PCT/US2022/072238, filed May 11, 2022 and published as WO 2022/241423, and/or International PCT Application No. PCT/US2022/070882, filed Mar. 1, 2022 and published as WO 2022/187805, which claims the filing benefits of U.S. provisional application Ser. No. 63/267,316, filed Jan. 31, 2022, U.S. provisional application Ser. No. 63/262,642, filed Oct. 18, 2021, U.S. provisional application Ser. No. 63/260,359, filed Aug. 18, 2021, U.S. provisional application Ser. No. 63/201,757, filed May 12, 2021, U.S. provisional application Ser. No. 63/201,371, filed Apr. 27, 2021, U.S. provisional application Ser. No. 63/200,451, filed Mar. 8, 2021, and U.S. provisional application Ser. No. 63/200,315, filed Mar. 1, 2021, which are all hereby incorporated herein by reference in their entireties).

The narrow beam LEDs 24b are angled or canted or biased (e.g., by ten degrees or thereabouts) toward the left and thus toward the driver of a left hand drive vehicle, while the wider beam LEDs 24a are not biased toward either side. When the mirror assembly is installed in a left hand drive vehicle, the narrow beam LEDs illuminate the driver's head region while the wider beam LEDs illuminate the passenger area as well as the driver area. However, when the mirror assembly is installed in a right hand drive vehicle, the narrow beam LEDs do not illuminate the driver's head region while the wider beam LEDs illuminate the passenger area as well as the driver area.

The mirror assembly may include a near infrared light emitter that is configured and operable to selectively emit light toward the driver head region when the mirror assembly is disposed in a left hand drive vehicle (with the driver sitting in a left side driver seat) or when the mirror assembly is disposed in a right hand drive vehicle (with the driver sitting in a right side driver seat). The system provides for DMS/OMS illumination that is software configurable based on vehicle data for the country code. For example, the DMS light emitters may comprise two or three separate banks/groups/sets of emitters or LEDs. One group is aimed or angled toward the left hand side of the vehicle and one group is aimed or angled toward the right hand side of the vehicle. Optionally, there is a third group that is aimed somewhere in between (in the illustrated examples discussed below, the third group is directed perpendicular to the mirror surface). These groups or sets can be made up of various combinations of wide and narrow LEDs or VCSELs. Knowing the country the vehicle is in and thus if it is a Left-Hand-Drive (LHD) vehicle or a Right-Hand-Drive (RHD) vehicle allows the software on the DMS/OMS ECU (remote or inside the mirror) to configure which LEDs are activated for specific DMS or OMS features and/or frames (such as by utilizing aspects of the driver/occupant monitoring systems described in International PCT Application No. PCT/US2022/072238, filed May 11, 2022 and published as WO 2022/241423, and/or International PCT Application No. PCT/US2022/070882, filed Mar. 1, 2022 and published as WO 2022/187805, which are hereby incorporated herein by reference in their entireties). Because the controller and system are software configurable, the mirror design can be common for LHD/RHD vehicles and can be used globally.

Figure 6:
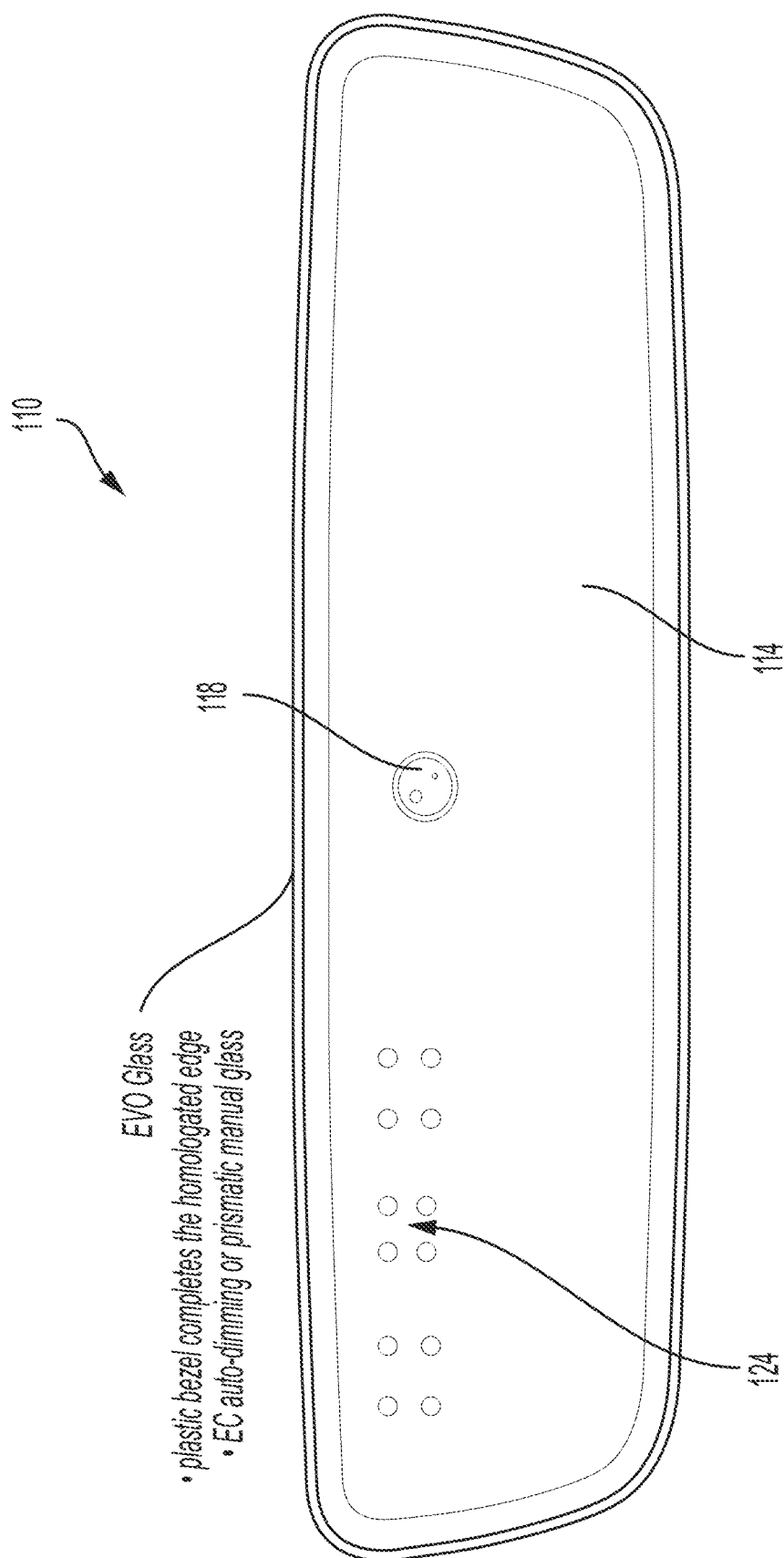
FIGS. 6 and 7 are plan views of other mirror heads of the interior rearview mirror assembly.
Figure 7:
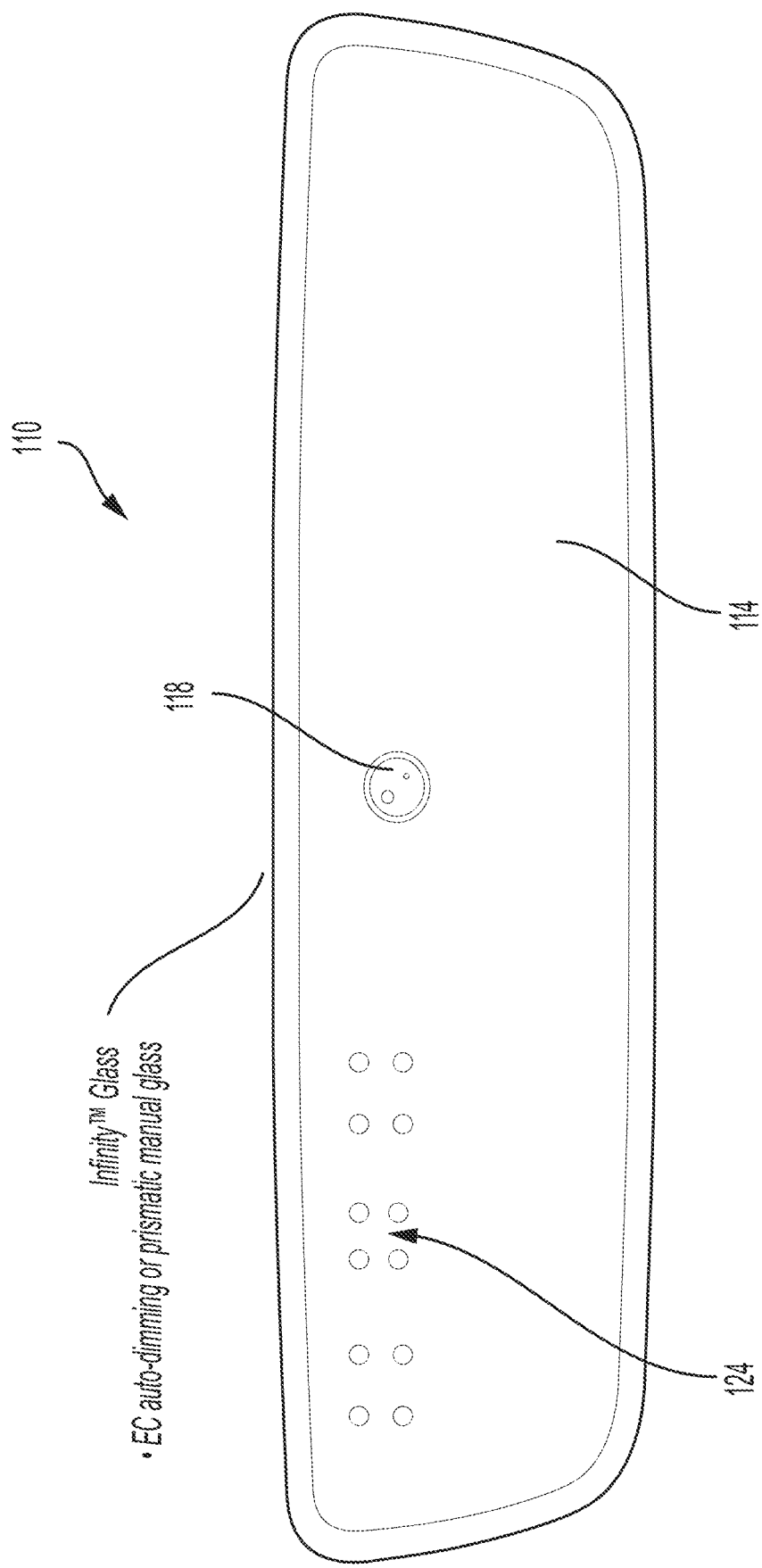
Figure 8:
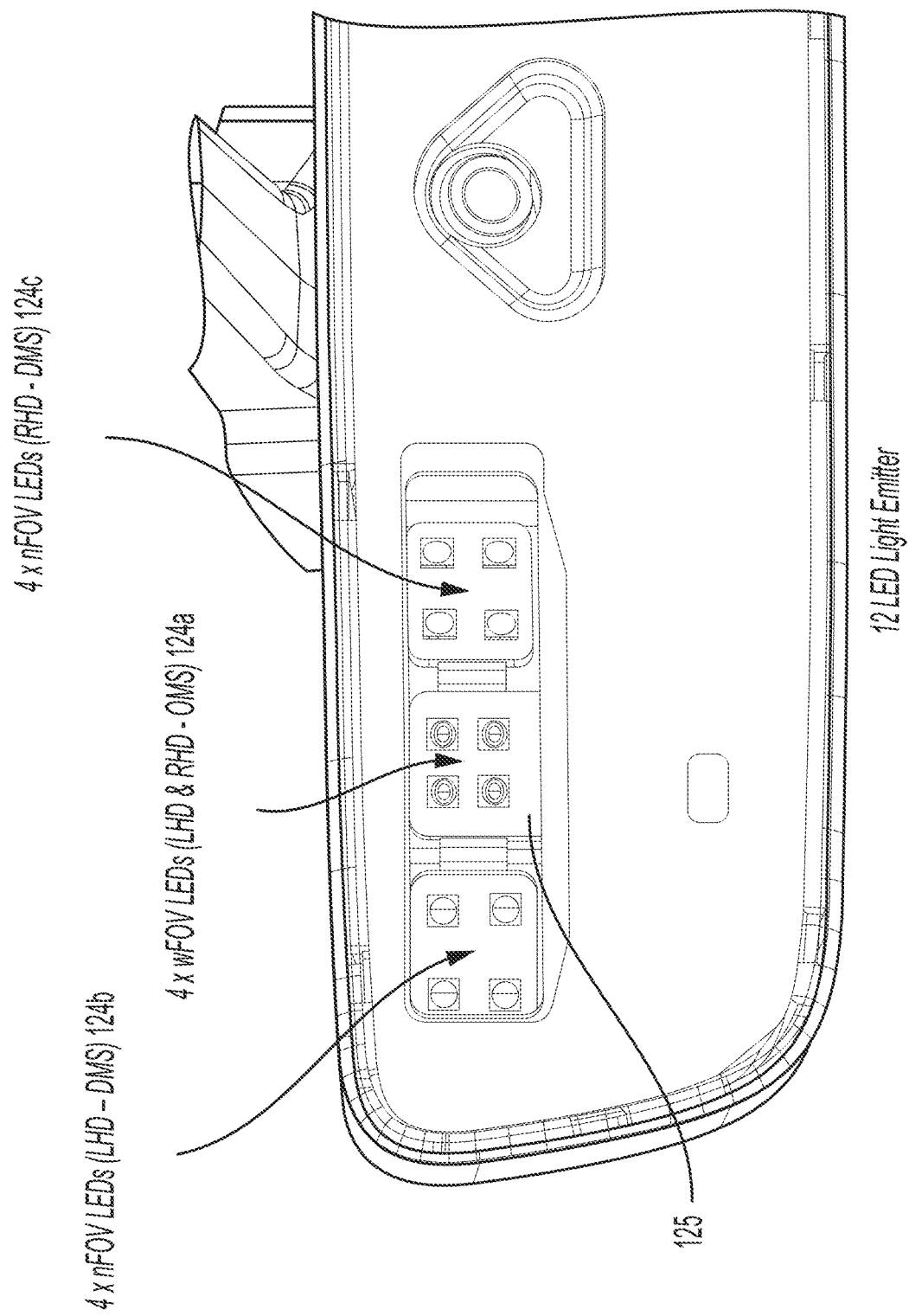
FIG. 8 is a plan view of the portion of the mirror head that accommodates the near infrared light emitters, with two narrow beam emitters, one for illuminating a driver's head of a left hand drive vehicle and the other for illuminating a driver's head of a right hand drive vehicle.

Thus, the DMS light emitters are provided in a mirror assembly with two sets of narrow beam LEDs, one set that is for illuminating a driver of a left hand drive vehicle when the mirror assembly is installed in the left hand drive vehicle, and another set that is for illuminating a driver of a right hand drive vehicle when the mirror assembly is installed in the right hand drive vehicle. For example, and with reference to FIGS. 6-8, the mirror assembly 110 includes the camera 118 and near IR light emitters 124 disposed behind the mirror reflective element 114 and at the left side of center of the mirror head. The near IR light emitters include three sets of LEDs (e.g., each set having four LEDs), including a wider beam set of LEDs 124a disposed between a first narrow beam set of LEDs 124b and a second narrow beam set of LEDs 124c. The wider beam set of LEDs 124a is centrally located at the light emitter PCB 125 and has no bias in either direction (i.e., its principal beam axis is generally normal to the planar surface of the mirror reflective element and with the beam providing greater than 100 degrees of illumination across the interior cabin, such as greater than 120 degrees of illumination across the interior cabin, such as greater than 150 degrees of illumination across the interior cabin), while the first narrow beam set of LEDs 124b is disposed at the left side of the wider set and is biased (e.g., canted or angled at about 0 to 20 degrees, preferably 5 to 15 degrees, such as, for example, 10 degrees) toward the left side, and the second narrow beam set of LEDs 124c is disposed at the right side of the wider set and is biased (e.g., canted or angled at about 10 to 30 degrees, preferably 15 to 25 degrees, such as, for example, 20 degrees or 22 degrees) toward the right side (and with each narrow beam set providing less than 100 degrees of illumination across the interior cabin, such as less than 80 degrees of illumination across the interior cabin, such as less than 60 degrees of illumination across the interior cabin). The light emitter circuit board 125 may comprise three parts, with the center part being parallel to the planar surface of the reflective element and with the side parts being angled or canted relative to the center part and relative to the planar surface of the reflective element to provide the desired or selected angling of the principal beam axis of the narrow beam set of LEDs. For applications where the light emitters are disposed at the right side of center of the mirror head, the angles of the narrow beam emitting light emitters would be reversed, so that the first narrow beam set of LEDs disposed at the left side of the wider set is biased (e.g., canted or angled at about 10 to 30 degrees, preferably 15 to 25 degrees, such as, for example, 20 degrees or 22 degrees) toward the left side, and the second narrow beam set of LEDs disposed at the right side of the wider set is biased (e.g., canted or angled at about 0 to 20 degrees, preferably 5 to 15 degrees, such as, for example, 10 degrees) toward the right side (and with each narrow beam set providing less than 100 degrees of illumination across the interior cabin, such as less than 80 degrees of illumination across the interior cabin, such as less than 60 degrees of illumination across the interior cabin).

Thus, when the mirror assembly is disposed in a left hand drive vehicle, the system is set so that the driver monitoring LEDs (that are energized when the system is capturing image data for the driver monitoring function) comprise the first narrow beam set of LEDs 124b, such that the driver's head is illuminated by the near infrared illumination emitted by the LEDs 124b during image capture for the driver monitoring function. Similarly, when the mirror assembly is disposed in a right hand drive vehicle, the system is set so that the driver monitoring LEDs comprise the second narrow beam set of LEDs 124b, such that the driver's head is illuminated by the near infrared illumination emitted by the LEDs 124b during image capture for the driver monitoring function. The wider beam set of LEDs is the same for either the left hand drive application or right hand drive application and provides wider illumination during image capture for the occupant monitoring function.

The light emitter is software enabled so that either the first or second narrow beam set of LEDs is enabled (for the driver monitoring function) depending on the type (left hand drive or right hand drive) of vehicle in which the mirror assembly is installed. Thus, when the mirror assembly is installed in a left hand drive vehicle, the first narrow beam set of LEDs is enabled (for the driver monitoring function) so that, when operating for the driver monitoring function, the first narrow beam set of LEDs is energized (and the second narrow beam set of LEDs is not enabled or energized). Alternatively, if the mirror assembly is installed in a right hand drive vehicle, the second narrow beam set of LEDs is enabled (for the driver monitoring function) so that, when operating for the driver monitoring function, the second narrow beam set of LEDs is energized (and the first narrow beam set of LEDs is not enabled or energized).

Figure 9:
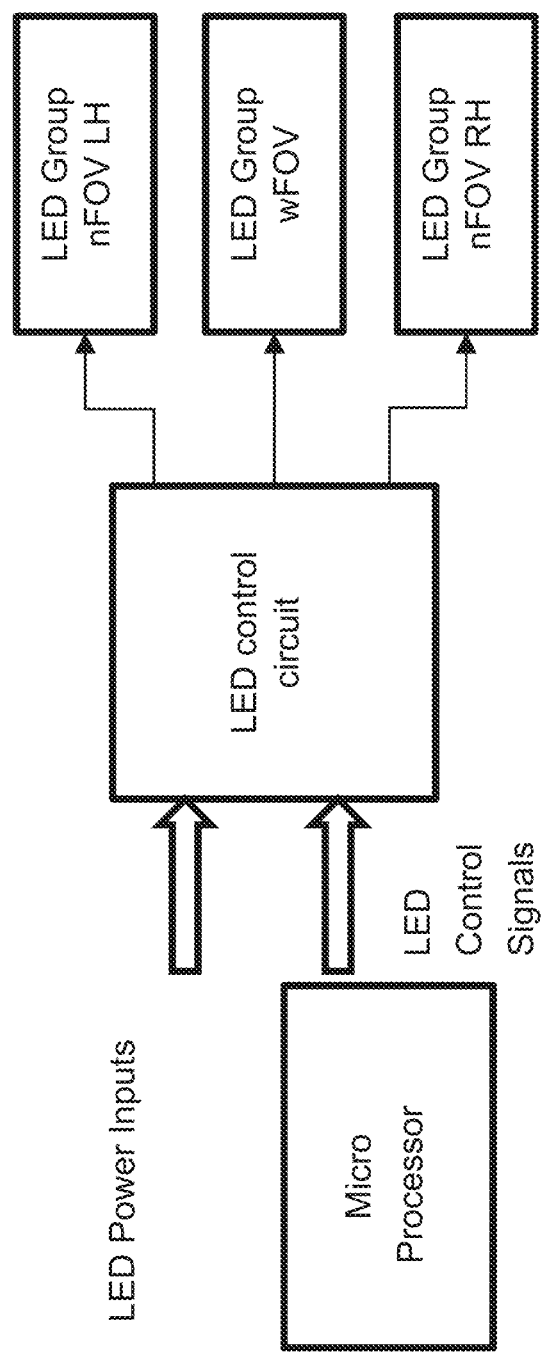
FIG. 9 is a block diagram of the controller for controlling the DMS light emitters.
Figures 10, 11:
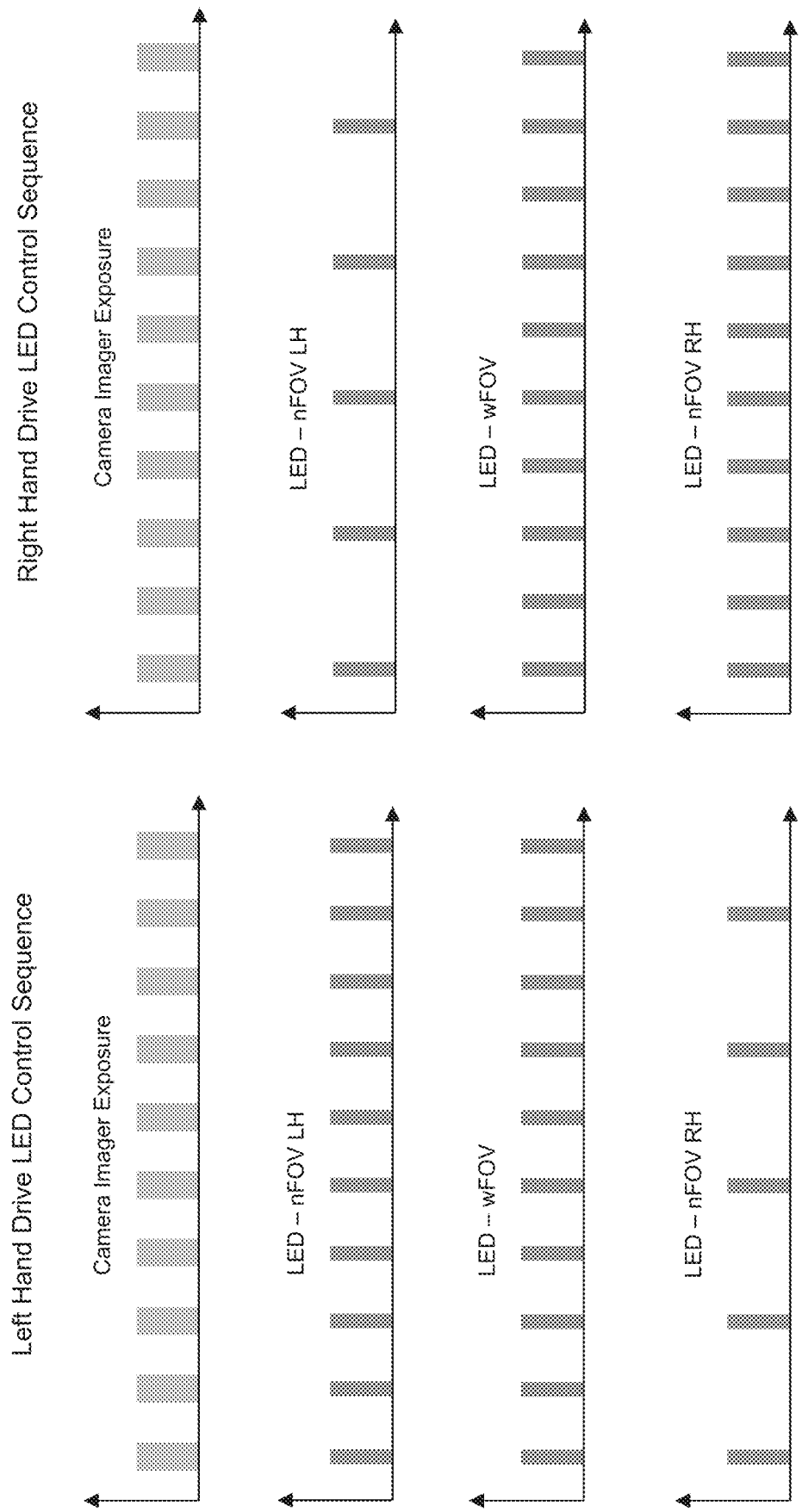
FIG. 10 shows graphs of the LED control sequence when the mirror assembly is installed in a left hand drive vehicle.
FIG. 11 shows graphs of the LED control sequence when the mirror assembly is installed in a right hand drive vehicle.

Thus, the driver monitoring system may control the LED control circuit to enable and energize or electrically power the appropriate set of LEDs depending on the type of vehicle and depending on whether the system is capturing image data for the driver monitoring function or the occupant monitoring function. As shown in FIG. 9, the different LED groups are electrically powered by an LED control circuit, which is provided LED control signals from the microprocessor. The LED control circuit may be disposed at the circuit board of the light emitter, and the microprocessor may be at the ECU of the mirror head or at a remote ECU in the vehicle. The microprocessor controls the light emitter in accordance with the image capturing by the DMS/OMS camera so the appropriate area of the vehicle cabin is illuminated by the light emitter depending on the particular function (driver monitoring or occupant monitoring) for which the system is currently capturing image data. The control sequences for actuating the different sets of LEDs of the light emitter may be similar to what is shown in FIG. 10 (for a left hand drive vehicle) or FIG. 11 (for a right hand drive vehicle). The selection or enabling of one of the narrow beam sets of LEDs may occur only once, such as when the mirror is installed at the LHD or RHD vehicle or before installation and when the mirror assembly is assembled or shipped to the assembly plant or at any other time prior to normal operation of the DMS/OMS. After the initial setting, the DMS will operate to energize the appropriate or selected or enabled narrow beam set for the DMS function and will not operate or energize the non-selected or not enabled narrow beam set for the DMS function.

Thus, when the mirror assembly is installed in a vehicle (typically at a vehicle assembly line) or installed as a replacement service part, and when the vehicle is powered, a signal or flag input is provided (e.g., via CAN bus signal or the like) to the electronic circuitry of the mirror assembly indicating that the vehicle is either a left hand drive vehicle or a right hand drive vehicle. Optionally, that signal may be provided at initial startup of the vehicle (after the mirror assembly is installed and the vehicle is assembled) or at each ignition cycle. Optionally, the signal may be provided when the mirror assembly is assembled (such as at the mirror assembly plant or mirror manufacturer) and designated for use in the left hand drive vehicle or right hand drive vehicle.

The electro-optic (such as electrochromic (EC)) mirror reflective element sub-assembly transmits near infrared light and reflects visible light. Thus, the mirror reflective element (i.e., a transflective mirror reflector of the mirror reflective element) effectively allows the IR emitters to emit light through the reflective element and allows the camera to 'view' through the mirror reflective element, while allowing the mirror reflective element to reflect at least some visible light incident thereat to serve its intended rear viewing purpose. The IR emitters may be activated responsive at least in part to an ambient light level within the vehicle cabin and at the driver's head region, with the light level being determined by a light sensor or by processing of image data captured by the driver monitoring camera. Although shown and described as being disposed behind the mirror reflective element and emitting light through and receiving light through the mirror reflective element, the light emitters and camera may be disposed at a lower region of the mirror head (with the mounting base attached at the interior portion of the left hand drive vehicle or the right hand drive vehicle) and below the mirror reflective element and movable in tandem with the mirror head.

As can be seen in FIGS. 4-8, the driver monitoring camera is centrally located in the mirror head. The nFOV near-IR LEDs that, in a RHD vehicle, monitor the driver's head, are positioned towards one lateral side of the mirror head and are angled [relative to the plane of the rear side of the rear glass surface of the EC Cell (its fourth surface)] at an acute angle around 10 degrees and view in a direction away from the lateral side of the mirror head. The nFOV near-IR LEDs that, in a LHD vehicle, illuminate the driver's head, are positioned closer to the central region of the mirror head (where the driver-monitoring camera is disposed) and are angled [relative to the plane of the rear side of the rear glass surface of the EC Cell (its fourth surface)] at an acute angle around 20 degrees and view in a direction opposite to that of the other nFOV LEDs. The wFOV near-IR LEDs that provide general cabin/occupant illumination are disposed in the mirror head between where the nFOV LEDs are located—and have their principal axis of view perpendicular to the plane of the rear side of the rear glass planar surface of the EC Cell.

Thus, the switch may allow current to bypass one subset of LEDs. When the switch is closed, current will flow through one subset of LEDs (e.g., the driver-side nFOV LEDs) and will bypass the other subset of LEDs (e.g., the passenger-side nFOV LEDs and the wFOV LEDs). In this way, the ECU can open the switch to provide current to the entire bank of LEDs (i.e., to the wFOV LEDs and to both sets of nFOV LEDs) such that all LEDs emit light (because with the switch open, none of the LEDs are bypassed) or the ECU can close the switch to provide current to only the driver-side nFOV LEDs (and bypassing the other LEDs). Thus, the ECU operates the switch to quickly and easily control an amount of light (and optionally direction of light or type or color of light) emitted by the bank of LEDs. Thus, the plurality of LEDs is electrically powered to emit light when the image data captured by the camera is processed at the ECU for the occupant monitoring function, and a subset of LEDs of the plurality of LEDs is electrically powered to emit light when the image data captured by the camera is processed at the ECU for the driver monitoring function (while bypassing another subset of LEDs that includes the passenger-side nFOV LEDs and the wFOV LEDs). The driver-side nFOV LEDs or driver monitoring subset of LEDs of the plurality of LEDs, when electrically powered to emit light, emits light to illuminate a driver's head region in the cabin of the vehicle. The other subset of LEDs of the plurality of LEDs (i.e., the passenger monitoring LEDs or passenger-side nFOV LEDs), when electrically powered to emit light, emits light at a first angle relative to the camera, and the driver-side nFOV LEDs or driver monitoring subset of LEDs of the plurality of LEDs, when electrically powered to emit light, emits light at a second angle relative to the camera, and wherein the first angle is different than the second angle. For example, the second subset of LEDs may comprise the nFOV LEDs for illuminating the driver's head region of the vehicle (such as a left side seating area for a left hand drive vehicle), and the first subset of LEDs may comprise the nFOV LEDs for illuminating the passenger's head region of the vehicle (such as a right side seating area for a left hand drive vehicle), with the first subset of LEDs optionally also including the wFOV LEDs.

Thus, upon ignition-on and/or at start-up of the propulsion system (such as an engine in an internal combustion engine vehicle or an electric drive in an electric vehicle) of the equipped vehicle, the One-Box Interior DMS Rearview Mirror Assembly is powered. When powered, the DMS camera captures frames of image data at a frame capture rate of at least 15 fps, preferably at least 30 fps, more preferably at least 60 fps. During driving, the ECU of the One-Box Interior DMS Rearview Mirror Assembly is aware of whether the vehicle is being driven in left hand drive (LHD) country or in a right hand drive (RHD) country. This can be based on data provided by the equipped vehicle based on likes of the current geographic location of the equipped vehicle as determined by the like of a GPS system. Also, when the vehicle first leaves its vehicle assembly plant, the automaker involved will have the steering column at the left side of the front cabin region for a LHD vehicle and will have the steering column at the right side of the front cabin region for a RHD vehicle. When set for a left hand drive vehicle or a right hand drive vehicle/knowing where the vehicle is being driven, the image processing of the image data captured by the DMS camera is set to process image data representative of the driver region (e.g., the left hand front seat region for a left hand drive vehicle or the right hand front seat region for a right hand drive vehicle) for DMS frame capture, and the light sources are controlled or powered to provide enhanced illumination of the driver region for the DMS frame capture. The light sources of the One-Box Interior DMS Rearview Mirror Assembly in a preferred embodiment include a first set of light sources (the wFOV light source) disposed between a second set of light sources (e.g., the left hand (LH) light source) and a third set of light sources (e.g., the right hand (RH) light source).

For a left hand drive vehicle equipped with the One-Box Interior DMS Rearview Mirror Assembly, during capture of a DMS set of captured frames of image data (for a driver monitoring function), the LHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the LHD nFOV light source and the wFOV light source combine to illuminate the head region of the driver (who is seated at the left side of the vehicle) with an irradiance of at least 1.25 W/m$^2$, more preferably at least 1.8 W/m$^2$ and most preferably at least 2.3 W/m$^2$. The LHD nFOV near-IR light source has a narrow field of illumination cone/zone that encompasses/illuminates the driver's head-box region (and thus provides enhanced irradiance at the driver's face. The wFOV near IR light source is also energized during this capture of the DMS set of captured frames of image data for the driver monitoring function, but the LHD nFOV near-IR light source is not energized. This selective energizing of one but not the other of the LHD and RHD light sources (taking a LHD drive as illustrative where the LHD light source is energized but the RHD light source is not energized) avoids wastefully generating heat within the mirror head by energizing the RHD light source that contributes scant illumination of the driver sitting in the left-hand driver's seat. The wFOV light source however adds some level of irradiance to the driver's head box region and also illuminates the area where the driver's hands would be (the steering wheel, center console, etc.) and thus regardless of whether in a LHD or a RHD vehicle, the wFOV light source is energized all the time the vehicle is powered and operated. Thus, for DMS frame capture in a left hand drive vehicle, the One-Box Interior DMS Rearview Mirror Assembly will only power the LHD nFOV light source and the wFOV light source since these are the light sources that will illuminate the driver of the left hand drive vehicle. Light emitted by the RHD nFOV light source, when powered, does not cover in any significance any part of the LH driver so the RHD nFOV light source is not powered during DMS frame capture in a LHD vehicle. Of course in a RHD vehicle, this reverses. For DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle.

For either a left hand drive vehicle or a right hand drive equipped with the One-Box Interior DMS Rearview Mirror Assembly, during capture of an OMS set of captured frames of image data (for an occupant monitoring function), all three sets of near-IR light sources (LHD nFOV and wFOV and RHD nFOV) are energized so that near-IR floodlighting within the vehicle cabin is maximized, and especially to illuminate likes of a second row of rear seats or even a third row of rear seats).

For the left hand drive vehicle equipped with the One-Box Interior DMS Rearview Mirror Assembly, during capture of an OMS set of captured frames of image data (for an occupant monitoring or occupant detection function), the LHD nFOV light source, the wFOV light source and the RHD nFOV light source (preferably a plurality of near-IR emitting LEDs comprising at least two LEDs and more preferably comprising four or less LEDs) are all energized. The illumination provided by the LHD nFOV light source, the wFOV light source and the RHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the RHD nFOV light source combine to illuminate the front passenger seat region with an irradiance of at least 0.15 W/m$^2$, of preferably at least 0.25 W/m$^2$, and more preferably at least 0.4 W/m$^2$.

Thus, for DMS frame capture in a left hand drive vehicle, the One-Box Interior DMS Rearview Mirror Assembly will only power the LHD nFOV light source and the wFOV light source since these are the light sources that will illuminate the driver of the left hand drive vehicle, and for OMS frame capture in the left hand drive vehicle, the One-Box Interior DMS Rearview Mirror Assembly will power the LHD nFOV light source, the wFOV light source and the RHD nFOV light source.

Similarly, for a right hand drive vehicle equipped with the One-Box Interior DMS Rearview Mirror Assembly, during capture of a DMS set of captured frames of image data (for a driver monitoring function), the RHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the RHD nFOV light source and the wFOV light source combine to illuminate the head region of the driver (at the right side of the vehicle) with an irradiance of at least 1.25 W/m$^2$, more preferably at least 1.8 W/m$^2$ and most preferably at least 2.3 W/m$^2$. The RHD nFOV light source has a narrow field of illumination cone that covers the driver's head box region (and thus provides enhanced irradiance at the driver's face without increasing the input power to the RHD nFOV light source, while also providing reduced heat generation in the system and reducing the number of LEDs needed), while the wFOV light source adds some level of irradiance to the driver's head box region but also illuminates the area where the driver's hands would be (the steering wheel, center console, etc.). Thus, for DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle. Light emitted by the LHD nFOV light source, when powered, does not cover any part of the RH driver so the LHD nFOV light source is not powered during DMS frame capture.

For the right hand drive vehicle equipped with the One-Box Interior DMS Rearview Mirror Assembly, during capture of an OMS set of captured frames of image data (for an occupant monitoring or occupant detection function), the RHD nFOV light source, the wFOV light source and the LHD nFOV light source (preferably a plurality of near-IR emitting LEDs comprising at least two LEDs and more preferably comprising four or less LEDs) are all energized. The illumination provided by the RHD nFOV light source, the wFOV light source and the LHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the LHD nFOV light source combine to illuminate the front passenger seat region with an irradiance of at least 0.15 W/m$^2$, of preferably at least 0.25 W/m$^2$, and more preferably at least 0.4 W/m$^2$.

Thus, for DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle, and for OMS frame capture in the right hand drive vehicle, the One-Box Interior DMS Rearview Mirror Assembly will power the RHD nFOV light source, the wFOV light source and the LHD nFOV light source.

The illumination protocols/scenarios described herein can be dynamic in that they can adjust to a current driving situation. For example, the illumination protocols can adjust for daytime/nighttime (by time of day or time of night) driving conditions; the illumination protocols can adjust responsive to a level of ambient cabin lighting, such as can occur on a sunny day vs cloudy day or at dawn or dusk; or the illumination protocols can adjust (such as for thermal management) to temporarily de-rate in-cabin illumination for a temporary limited period of time after ignition-on or start-up occurs when the vehicle has been parked out in the sun on a hot sunny day.

Whether the One-Box Interior DMS Rearview Mirror Assembly is disposed in a LHD vehicle or a RHD vehicle, the DMS camera, for purposes of occupancy detection, preferably has a field of illumination that covers the seating positions (front and rear) of occupants of the vehicle. Similarly, to provide near-IR floodlighting of such passengers seated in the interior cabin of the vehicle, the field of illumination by the wFOV near-IR illuminator, whether the One-Box Interior DMS Rearview Mirror Assembly is used in a LHD or a RHD vehicle, covers the seating positions (front and rear) of occupants of the vehicle. However, for DMS functionality, it is desirable that the driver's face/head/body is near-IR illuminated as intensely as possible. Thus, for a LHD vehicle, it is desirable to have the LHD nFOV near-IR illuminator directed toward the driver of the LHD vehicle, while for a RHD vehicle, it is desirable to have the RHD nFOV near-IR illuminator directed toward the driver of the RHD vehicle. Given that the central area of the DMS mirror head has limited space to accommodate the camera, a wFOV near-IR illuminator, an nFOV near-IR illuminator and the mirror pivot joint and similar/associated hardware, the nFOV near-IR illuminators, for practical reasons, are disposed to the left side of the camera or to the right side of the camera.

Figure 12C:
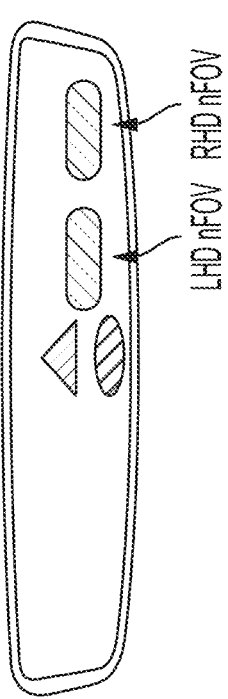
FIGS. 12A-E show different locations for the wFOV and nFOV near-IR illuminators at a mirror head for the One-Box Interior DMS Rearview Mirror Assembly.
Figure 12D:
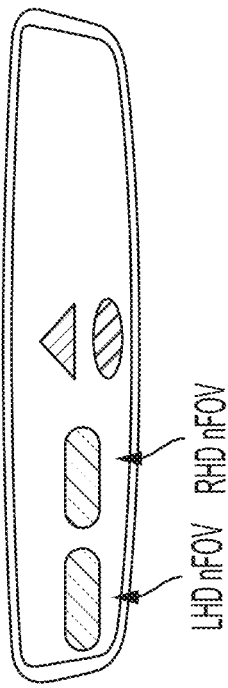
Figure 12E:
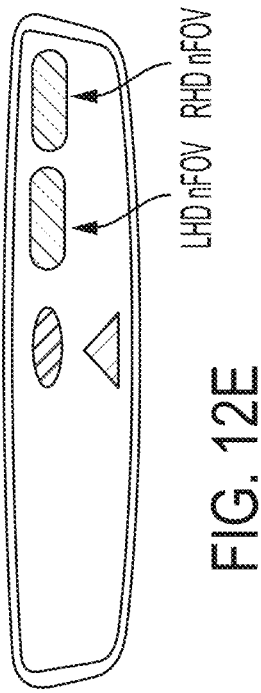
Figure 12A:
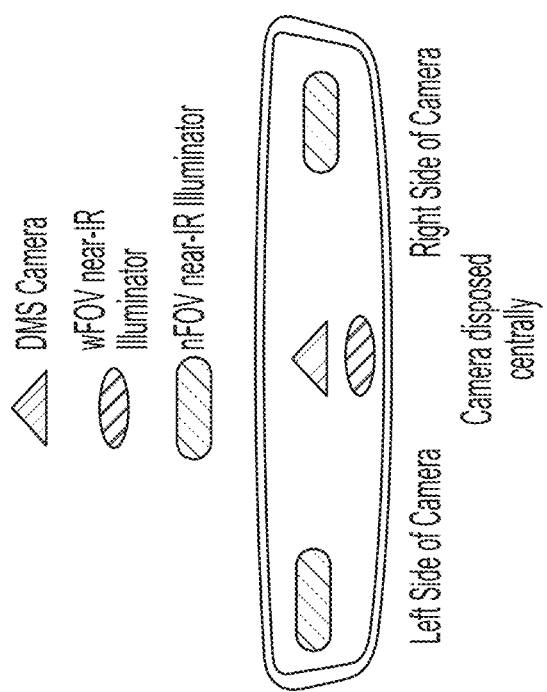

Optionally, for practical reasons, such as manufacturing and packaging and cost reasons, it can be desirable to have the nFOV near-IR illuminators on one side (e.g., the left side) or the other side (e.g., the right side) of the camera centrally disposed in the mirror head or to have the LHD nFOV near-IR illuminator on one side (e.g., the left side) and the RHD nFOV near-IR illuminator on the other side (e.g., the right side). For example, and such as shown in FIG. 12A, a One-Box Interior DMS Rearview Mirror Assembly may have the camera and the wFOV near-IR illuminator centrally disposed at the mirror head (with the camera centrally located above or below the wFOV near-IR illuminator), with one of the nFOV near-IR illuminators (e.g., the LHD nFOV near-IR illuminator that is for illuminating the driver of a LHD vehicle) disposed at the left side of the mirror head (at the left side of the camera) and the other of the nFOV near-IR illuminators (e.g., the RHD nFOV near-IR illuminator that is for illuminating the driver of a RHD vehicle) disposed at the right side of the mirror head (at the right side of the camera). Alternatively, it is contemplated that the LHD nFOV near-IR illuminator may be disposed at the right side of the mirror head and the RHD nFOV near-IR illuminator may be disposed at the left side of the mirror head.

Figure 12B:
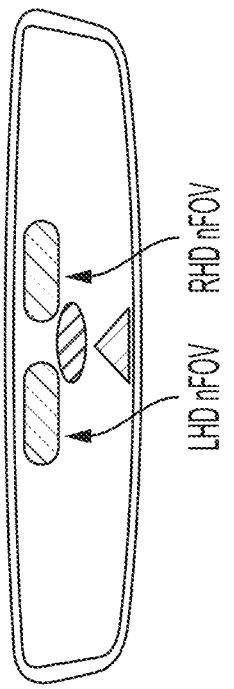

Optionally, the nFOV near-IR illuminators may be more centrally disposed in the mirror head (such as above or below the centrally located wFOV near-IR illuminator). For example, and such as shown in FIG. 12B, the wFOV near-IR illuminator may be centrally located (e.g., above or below the centrally located camera), and the nFOV near-IR illuminators may be disposed at or above (or below) the wFOV near-IR illuminator. As shown in FIG. 12B, one of the nFOV near-IR illuminators (e.g., the LHD nFOV near-IR illuminator that is for illuminating the driver of a LHD vehicle) is disposed at the left side of the centerline of the mirror head (at the left side of the camera) and the other of the nFOV near-IR illuminators (e.g., the RHD nFOV near-IR illuminator that is for illuminating the driver of a RHD vehicle) is disposed at the right side of the centerline of the mirror head (at the right side of the camera). Alternatively, it is contemplated that the LHD nFOV near-IR illuminator may be disposed at the right side of the centerline of the mirror head and the RHD nFOV near-IR illuminator may be disposed at the left side of the centerline of the mirror head. It is further contemplated that the LHD nFOV near-IR illuminator and the RHD nFOV near-IR illuminator may be vertically arranged at the centerline of the mirror head, with one above the other.

Optionally, the wFOV near-IR illuminator may be centrally disposed (e.g., above or below the centrally disposed camera), and both nFOV near-IR illuminators may be disposed at one side or the other of the mirror head. For example, and such as shown in FIG. 12C, the wFOV near-IR illuminator is centrally disposed (e.g., above or below the centrally disposed camera), and the LHD and RHD nFOV near-IR illuminators are disposed at the right side of the mirror head, with the LHD nFOV near-IR illuminator disposed closer to the center of the mirror head than the RHD nFOV near-IR illuminator. Alternatively, and such as shown in FIG. 12D, the wFOV near-IR illuminator is centrally disposed (e.g., above or below the centrally disposed camera), and the LHD and RHD nFOV near-IR illuminators are disposed at the left side of the mirror head, with the RHD nFOV near-IR illuminator disposed closer to the center of the mirror head than the LHD nFOV near-IR illuminator. Optionally, the wFOV near-IR illuminator and/or the nFOV near-IR illuminators may be disposed at a lower region of the mirror head (see FIGS. 12C and 12D) or may be disposed at an upper region of the mirror head (see FIG. 12E). Thus, and such as shown in FIG. 12E, one or both of the nFOV near-IR illuminators may be higher up toward the upper region of the mirror head, and/or the wFOV near-IR illuminator may be higher up toward the upper region of the mirror head.

In a vehicle (whether LHD or RHD), the driver grasps the mirror head to adjust what the interior mirror reflective element views so that the driver sees out the rear window of the equipped vehicle. The camera moves in tandem with movement of the mirror head by the driver. In so doing, the driver moves the mirror head to a position/orientation where the driver-monitoring camera within the mirror head is viewing the head of the driver.

The near-IR signal emitted by the LEDs is preferably at 940 nm wavelength so that it is more readily recognized by the DMS processor (there is a decrease in ambient solar light at that wavelength due to absorption of 940 nm light by water in the atmosphere). The DMS camera includes a filter that allows/passes that wavelength and attenuates other light. The camera will thus operate with an enhanced 940 nm signal, which enhances driver monitoring in situations where the driver is wearing sunglasses. The rest of the in-cabin light (i.e., the ambient light) is filtered so the camera focuses on the 940 nm wavelength and then avoids "seeing" reflection at sunglasses. The DMS function may provide dynamic camera control (increase or decrease exposure time or frame capture rate) and LED control (increase or decrease power to LEDs and/or increase or decrease on time) to accommodate changes in lighting and/or to accommodate driver sunglasses or the like.

The mirror reflector may comprise a stack of coatings specific to the needs related to three basic requirements: (i) reflect much of the visible light to prevent seeing details such as the camera behind the glass (this can also be stated as transmitting less than 25% of visible light, one way through the glass subassembly), (ii) transmit near infrared (NIR) that comes out from NIR LEDs behind the glass, reflects off occupants and comes back to the camera behind the glass (the goal for the coating is greater than 95% transmission at 940 nm wavelength) and (iii) control the color of reflected light incident at the mirror reflective element to be neutral or to the blue side for any manufacturing variance, avoiding red and green shifts. Also, due to fixed as well as variable costs, it is desirable to have the minimum number of layers in the coating as well as minimum total thickness of all layers.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2022-0254132; US-2022-0242438; US-2022-0111857; US-2021-0323473; US-2021-0291739; US-2020-0202151; US-2020-0320320; US-2020-0143560; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/663,462, filed May 16, 2022, and/or International Application No. PCT/US2022/072238, filed May 11, 2022 and published as WO 2022/241423, and/or International Application No. PCT/US2022/070882, filed Mar. 1, 2022 and published as WO 2022/187805, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International PCT Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or U.S. Publication No. US-2021-0162926 and/or International PCT Publication No. WO 2022/150826, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724, 187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Therefore, a vehicular cabin monitoring system comprises an interior rearview mirror assembly having a mirror head adjustably attached to a mounting structure, the mounting structure configured to attach at an interior portion of a vehicle equipped with the vehicular cabin monitoring system. The mirror head comprises a mirror reflective element. A camera is accommodated by the mirror head, and a plurality of light emitters, such as, for example, a plurality of light emitting diodes (LEDs), is accommodated by the mirror head. A current driver is configured to provide electrical current to the plurality of LEDs to electrically power the plurality of LEDs to emit light. An electronic switch is operable in an open state or in a closed state. When the electronic switch operates in the open state, electrical current provided by the current driver passes through each individual LED of the plurality of LEDs, and when the electronic switch operates in the closed state, electrical current provided by the current driver bypasses at least one individual LED of the plurality of LEDs and passes through the remaining individual LEDs of the plurality of LEDs. An electronic control unit (ECU) comprises electronic circuitry and associated software. The electronic circuitry of the ECU comprises an image processor for processing image data captured by the camera. With the mounting structure attached at the interior portion of the vehicle, the electronic switch operates in the open state when the image data captured by the camera is processed at the ECU for an occupant monitoring function. With the mounting structure attached at the interior portion of the vehicle, the electronic switch operates in the closed state when the image data captured by the camera is processed at the ECU for a driver monitoring function.

The electronic switch may be connected in series with a first subset of LEDs of the plurality of LEDs, and the electronic switch may be connected in parallel with a second subset of LEDs of the plurality of LEDs. When the electronic switch operates in the closed state, the electrical current provided by the current driver bypasses the second subset of LEDs.

The electronic switch may comprise a metal-oxide-semiconductor field-effect transistor (MOSFET).

The electronic switch may operate in the open state responsive to a first signal generated by the ECU. The electronic switch may operate in the closed state responsive to a second signal generated by the ECU.

Optionally, a first subset of LEDs of the plurality of LEDs is electrically powered to emit light when the image data captured by the camera is processed at the ECU for the occupant monitoring function, and a second subset of LEDs of the plurality of LEDs is electrically powered to emit light when the image data captured by the camera is processed at the ECU for the driver monitoring function. The second subset of LEDs of the plurality of LEDs, when electrically powered to emit light, emits light to illuminate a driver's head region in the cabin of the vehicle. The first subset of LEDs of the plurality of LEDs, when electrically powered to emit light, emits light at a first angle relative to the camera, and wherein the second subset of LEDs of the plurality of LEDs, when electrically powered to emit light, emits light at a second angle relative to the camera, and wherein the first angle is different than the second angle. For example, the second subset of LEDs may comprise the nFOV LEDs for illuminating the driver's head region of the vehicle (such as a left side seating area for a left hand drive vehicle), and the first subset of LEDs may comprise the nFOV LEDs for illuminating the passenger's head region of the vehicle (such as a right side seating area for a left hand drive vehicle), with the first subset of LEDs optionally also including the wFOV LEDs.

The plurality of LEDs, when electrically powered to emit light, emit near infrared light. A first subset of LEDs of the plurality of LEDs, when electrically powered to emit light, emits light at a first angle relative to the camera, and a second subset of LEDs of the plurality of LEDs, when electrically powered to emit light, emits light at a second angle relative to the camera, and wherein the first angle is different than the second angle.

The ECU enables the current driver when the camera is capturing image data, and the ECU disables the current driver when the camera is not capturing image data.

A second electronic switch may be operable in an open state or a closed state. When the second electronic switch operates in the closed state, the electrical current provided by the current driver bypasses at least one different LED of the plurality of LEDs than the at least one LED that is bypassed when the electronic switch operates in the closed state.

When the electronic switch operates in the open state, the individual LEDs of the plurality of LEDs are electrically connected in series, and when the electronic switch is operating in the open state, the at least one LED of the plurality of LEDs is not electrically connected in series with the remaining individual LEDs of the plurality of LEDs.

The current driver may provide a first amperage of electrical current when the camera captures image data for the occupant monitoring function, and the current driver provides a second amperage of electrical current when the camera captures image data for the driver monitoring function, with the first amperage of electrical current being different than the second amperage of electrical current.

The ECU may be disposed within the mirror head.

The camera and the plurality of LEDs may be disposed within the mirror head and behind the mirror reflective element. The camera may view through the mirror reflective element and the plurality of LEDs, when electrically powered to emit light, may emit light through the mirror reflective element.

A vehicular cabin monitoring system comprises an interior rearview mirror assembly having a mirror head adjustably attached to a mounting structure, the mounting structure configured to attach at an interior portion of a vehicle equipped with the vehicular cabin monitoring system. The mirror head comprises a mirror reflective element. A camera is accommodated by the mirror head, and a plurality of light emitters, such as, for example, a plurality of light emitting diodes (LEDs), is accommodated by the mirror head. A current driver is configured to provide electrical current to the plurality of LEDs to electrically power the plurality of LEDs to emit light. The plurality of LEDs, when electrically powered to emit light, emit near infrared light. An electronic switch is operable in an open state or in a closed state. When the electronic switch operates in the open state, electrical current provided by the current driver passes through a first subset of LEDs of the plurality of LEDs and a second subset of LEDs of the plurality of LEDs, and when the electronic switch operates in the closed state, electrical current provided by the current driver bypasses the first subset of LEDs of the plurality of LEDs and passes through the second subset of LEDs of the plurality of LEDs. An electronic control unit (ECU) comprises electronic circuitry and associated software. The electronic circuitry of the ECU comprises an image processor for processing image data captured by the camera. With the mounting structure attached at the interior portion of the vehicle, the electronic switch operates in the open state when the image data captured by the camera is processed at the ECU for an occupant monitoring function. With the mounting structure attached at the interior portion of the vehicle, the electronic switch operates in the closed state when the image data captured by the camera is processed at the ECU for a driver monitoring function.

The first subset of LEDs of the plurality of LEDs, when electrically powered to emit light, may emit light at a first angle relative to the camera, and the second subset of LEDs of the plurality of LEDs, when electrically powered to emit light, may emit light at a second angle relative to the camera, with the first angle being different than the second angle.

A vehicular cabin monitoring system comprises an interior rearview mirror assembly having a mirror head adjustably attached to a mounting structure, the mounting structure configured to attach at an interior portion of a vehicle equipped with the vehicular cabin monitoring system. The mirror head comprises a mirror reflective element. A camera is accommodated by the mirror head, and a plurality of light emitters, such as, for example, a plurality of light emitting diodes (LEDs), is accommodated by the mirror head. A current driver is configured to provide electrical current to the plurality of LEDs to electrically power the plurality of LEDs to emit light. The camera and the plurality of LEDs are disposed within the mirror head and behind the mirror reflective element, and the camera views through the mirror reflective element and the plurality of LEDs, when electrically powered to emit light, emit light through the mirror reflective element. The plurality of LEDs, when electrically powered to emit light, emit near infrared light. A first subset of LEDs of the plurality of LEDs, when electrically powered to emit light, emits light at a first angle relative to the mirror reflective element, and a second subset of LEDs of the plurality of LEDs, when electrically powered to emit light, emits light at a second angle relative to the mirror reflective element, with the first angle being different than the second angle. An electronic switch is operable in an open state or in a closed state. When the electronic switch operates in the open state, electrical current provided by the current driver passes through the first subset of LEDs of the plurality of LEDs and the second subset of LEDs of the plurality of LEDs, and when the electronic switch operates in the closed state, electrical current provided by the current driver bypasses the first subset of LEDs of the plurality of LEDs and passes through the second subset of LEDs of the plurality of LEDs. An electronic control unit (ECU) comprises electronic circuitry and associated software. The electronic circuitry of the ECU comprises an image processor for processing image data captured by the camera. With the mounting structure attached at the interior portion of the vehicle, the electronic switch operates in the open state when the image data captured by the camera is processed at the ECU for an occupant monitoring function. With the mounting structure attached at the interior portion of the vehicle, the electronic switch operates in the closed state when the image data captured by the camera is processed at the ECU for a driver monitoring function.

The first subset of LEDs may comprise at least one LED (such as two or more LEDs) configured to illuminate a passenger seat region of the vehicle (such as at an angle relative to the camera or mirror reflective element), and wherein the second subset of LEDs comprises at least one LED (such as two or more LEDs) configured to illuminate a driver seat region of the vehicle (such as at another angle relative to the camera or mirror reflective element). The first subset of LEDs may further comprise at least one LED (such as two or more LEDs) configured to illuminate a central cabin region of the vehicle (such as wider field of illumination LEDs as compared to narrower field of illumination LEDs of the other LEDs).

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular interior cabin monitoring system, the vehicular interior cabin monitoring system comprising:
   an interior rearview mirror assembly configured to attach at an interior portion of a vehicle equipped with the vehicular interior cabin monitoring system, wherein the interior rearview mirror assembly comprises a mirror head adjustable about a mounting structure, and wherein the mirror head comprises a mirror reflective element;

a camera accommodated by the mirror head;

wherein the camera is operable to capture image data;

a plurality of sets of light sources accommodated by the mirror head, wherein each set of light sources of the plurality of sets of light sources comprises at least two individual light sources;

a current driver, wherein the current driver is operable to provide electrical current to the individual light sources of the plurality of sets of light sources to electrically operate the individual light sources to emit near infrared light;

a plurality of electronic switches, wherein each individual electronic switch of the plurality of electronic switches is switchable between an opened state and a closed state;

wherein each individual electronic switch of the plurality of electronic switches (i) is connected in parallel across a respective set of light sources of the plurality of sets of light sources and (ii) is connected in series with at least one other set of light sources of the plurality of sets of light sources when at least one other electronic switch of the plurality of electronic switches is switched to its opened state;

wherein, with each individual electronic switch of the plurality of electronic switches switched to its respective opened state, electrical current provided by the current driver passes through the individual light sources of the plurality of sets of light sources;

wherein the plurality of electronic switches comprises at least (i) a first electronic switch that is connected in parallel across a first set of light sources of the plurality of sets of light sources and (i) a second electronic switch that is connected in parallel across a second set of light sources of the plurality of sets of light sources;

wherein, with the first electronic switch of the plurality of electronic switches switched to its closed state and the second electronic switch of the plurality of electronic switches switched to its opened state, electrical current bypasses the individual light sources of the first set of light sources that the first electronic switch is connected in parallel across and passes through the individual light sources of the second set of light sources that the second electronic switch is connected in parallel across;

an electronic control unit (ECU) comprising electronic circuitry and associated software;

wherein the electronic circuitry of the ECU comprises an image processor for processing image data captured by the camera; and wherein, with the interior rearview mirror assembly attached at the interior portion of the vehicle, the vehicular interior cabin monitoring system is (i) operable to provide an occupant detection function where image data captured by the camera is processed at the ECU for detecting an occupant present within an interior cabin of the vehicle and (ii) operable to provide a driver monitoring function where image data captured by the camera is processed at the ECU for monitoring a driver of the vehicle.

2. The vehicular interior cabin monitoring system of claim 1, wherein each individual electronic switch of the plurality of electronic switches comprises a metal-oxide-semiconductor field-effect transistor (MOSFET).

3. The vehicular interior cabin monitoring system of claim 1, wherein each individual electronic switch of the plurality of electronic switches is switched to its respective opened state responsive to a respective first signal generated by the ECU.

4. The vehicular interior cabin monitoring system of claim 3, wherein each individual electronic switch of the plurality of electronic switches is switched to its respective closed state responsive to a respective second signal generated by the ECU.

5. The vehicular interior cabin monitoring system of claim 1, wherein the ECU enables the current driver when the camera is capturing image data, and wherein the ECU disables the current driver when the camera is not capturing image data.

6. The vehicular interior cabin monitoring system of claim 1, wherein the current driver provides a first amperage of electrical current when the vehicular interior cabin monitoring system is operating to provide the occupant detection function, and wherein the current driver provides a second amperage of electrical current when the vehicular interior cabin monitoring system is operating to provide the driver monitoring function, and wherein the first amperage of electrical current is different than the second amperage of electrical current.

7. The vehicular interior cabin monitoring system of claim 1, wherein each individual light source of each set of light sources of the plurality of sets of light sources comprises a near infrared light emitting light emitting diode.

8. The vehicular interior cabin monitoring system of claim 1, wherein each set of light sources of the plurality of sets of light sources comprises at least two near infrared light emitting light emitting diodes.

9. The vehicular interior cabin monitoring system of claim 1, wherein each set of light sources of the plurality of sets of light sources comprises at least three near infrared light emitting light emitting diodes.

10. The vehicular interior cabin monitoring system of claim 1, wherein, with the interior rearview mirror assembly attached at the interior portion of the vehicle, and with the vehicular interior cabin monitoring system operating to provide the occupant detection function, the individual electronic switches of the plurality of electronic switches are switched to their respective opened states and the individual light sources of the plurality of sets of light sources are electrically operated to emit near infrared light.

11. The vehicular interior cabin monitoring system of claim 1, wherein the first set of light sources that the first electronic switch is connected in parallel across, when electrically operated to emit near infrared light, emits near infrared light at a first angle relative to the camera, and wherein the second set of light sources that the second electronic switch is connected in parallel across, when electrically operated to emit near infrared light, emits near infrared light at a second angle relative to the camera, and wherein the first angle is different than the second angle.

12. The vehicular interior cabin monitoring system of claim 11, wherein, with the interior rearview mirror assembly attached at the interior portion of the vehicle, the first set of light sources that the first electronic switch is connected in parallel across, when electrically operated to emit near infrared light, illuminates at least a driver's head region in the interior cabin of the vehicle.

13. The vehicular interior cabin monitoring system of claim 12, wherein, with the interior rearview mirror assembly attached at the interior portion of the vehicle, the second set of light sources that the second electronic switch is connected in parallel across, when electrically operated to emit near infrared light, illuminates a central region of the interior cabin of the vehicle.

14. The vehicular interior cabin monitoring system of claim 12, wherein, with the interior rearview mirror assembly attached at the interior portion of the vehicle, the second set of light sources that the second electronic switch is connected in parallel across, when electrically operated to emit near infrared light, illuminates a passenger seat region of the interior cabin of the vehicle.

15. The vehicular interior cabin monitoring system of claim 1, wherein the ECU is disposed within the mirror head.

16. The vehicular interior cabin monitoring system of claim 1, wherein the camera and the plurality of sets of light sources are disposed within the mirror head and behind the mirror reflective element, and wherein the camera views through the mirror reflective element, and wherein the plurality of sets of light sources, when electrically operated to emit near infrared light, emits near infrared light that passes through the mirror reflective element.

17. The vehicular interior cabin monitoring system of claim 1, wherein the interior portion of the vehicle comprises an in-cabin side of a windshield of the vehicle.

18. A vehicular interior cabin monitoring system, the vehicular interior cabin monitoring system comprising:
    an interior rearview mirror assembly configured to attach at an interior portion of a vehicle equipped with the vehicular interior cabin monitoring system, wherein the interior rearview mirror assembly comprises a mirror head adjustable about a mounting structure, and wherein the mirror head comprises a mirror reflective element;
    a camera accommodated by the mirror head;
    wherein the camera is operable to capture image data;
    a plurality of sets of light sources accommodated by the mirror head, wherein each set of light sources of the plurality of sets of light sources comprises at least two individual light sources;
    a current driver, wherein the current driver is operable to provide electrical current to the individual light sources of the plurality of sets of light sources to electrically operate the individual light sources to emit near infrared light;
    a plurality of electronic switches, wherein each individual electronic switch of the plurality of electronic switches is switchable between an opened state and a closed state;
    an electronic control unit (ECU) comprising electronic circuitry and associated software;
    wherein each individual electronic switch of the plurality of electronic switches is switched to its respective opened state responsive to a respective first signal generated by the ECU, and wherein each individual electronic switch of the plurality of electronic switches is switched to its respective closed state responsive to a respective second signal generated by the ECU;
    wherein the ECU enables the current driver when the camera is capturing image data, and wherein the ECU disables the current driver when the camera is not capturing image data;
    wherein each individual electronic switch of the plurality of electronic switches (i) is connected in parallel across a respective set of light sources of the plurality of sets of light sources and (ii) is connected in series with at least one other set of light sources of the plurality of sets of light sources when at least one other electronic switch of the plurality of electronic switches is switched to its opened state;
    wherein, with each individual electronic switch of the plurality of electronic switches switched to its respective opened state, electrical current provided by the current driver passes through the individual light sources of the plurality of sets of light sources;
    wherein the plurality of electronic switches comprises at least (i) a first electronic switch that is connected in parallel across a first set of light sources of the plurality of sets of light sources and (i) a second electronic switch that is connected in parallel across a second set of light sources of the plurality of sets of light sources;
    wherein, with the first electronic switch of the plurality of electronic switches switched to its closed state and the second electronic switch of the plurality of electronic switches switched to its opened state, electrical current bypasses the individual light sources of the first set of light sources that the first electronic switch is connected in parallel across and passes through the individual light sources of the second set of light sources that the second electronic switch is connected in parallel across;
    wherein the electronic circuitry of the ECU comprises an image processor for processing image data captured by the camera; and
    wherein, with the interior rearview mirror assembly attached at the interior portion of the vehicle, the vehicular interior cabin monitoring system is (i) operable to provide an occupant detection function where image data captured by the camera is processed at the ECU for detecting an occupant present within an interior cabin of the vehicle and (ii) operable to provide a driver monitoring function where image data captured by the camera is processed at the ECU for monitoring a driver of the vehicle.

19. The vehicular interior cabin monitoring system of claim 18, wherein each individual electronic switch of the plurality of electronic switches comprises a metal-oxide-semiconductor field-effect transistor (MOSFET).

20. The vehicular interior cabin monitoring system of claim 18, wherein the current driver provides a first amperage of electrical current when the vehicular interior cabin monitoring system is operating to provide the occupant detection function, and wherein the current driver provides a second amperage of electrical current when the vehicular interior cabin monitoring system is operating to provide the driver monitoring function, and wherein the first amperage of electrical current is different than the second amperage of electrical current.

21. The vehicular interior cabin monitoring system of claim 18, wherein each individual light source of each set of light sources of the plurality of sets of light sources comprises a near infrared light emitting light emitting diode.

22. The vehicular interior cabin monitoring system of claim 18, wherein each set of light sources of the plurality of sets of light sources comprises at least two near infrared light emitting light emitting diodes.

23. The vehicular interior cabin monitoring system of claim 18, wherein each set of light sources of the plurality of sets of light sources comprises at least three near infrared light emitting light emitting diodes.

24. The vehicular interior cabin monitoring system of claim 18, wherein, with the interior rearview mirror assembly attached at the interior portion of the vehicle, and with the vehicular interior cabin monitoring system operating to provide the occupant detection function, the individual electronic switches of the plurality of electronic switches are switched to their respective opened states and the individual light sources of the plurality of sets of light sources are electrically operated to emit near infrared light.

25. The vehicular interior cabin monitoring system of claim 18, wherein the ECU is disposed within the mirror head.

26. The vehicular interior cabin monitoring system of claim 18, wherein the camera and the plurality of sets of light sources are disposed within the mirror head and behind the mirror reflective element, and wherein the camera views through the mirror reflective element, and wherein the plurality of sets of light sources, when electrically operated to emit near infrared light, emits near infrared light that passes through the mirror reflective element.

27. The vehicular interior cabin monitoring system of claim 18, wherein the interior portion of the vehicle comprises an in-cabin side of a windshield of the vehicle.

28. A vehicular interior cabin monitoring system, the vehicular interior cabin monitoring system comprising:
an interior rearview mirror assembly configured to attach at an interior portion of a vehicle equipped with the vehicular interior cabin monitoring system, wherein the interior rearview mirror assembly comprises a mirror head adjustable about a mounting structure, and wherein the mirror head comprises a mirror reflective element;
a camera accommodated by the mirror head;
wherein the camera is operable to capture image data;
a plurality of sets of light sources accommodated by the mirror head, wherein each set of light sources of the plurality of sets of light sources comprises at least two individual light sources;
a current driver, wherein the current driver is operable to provide electrical current to the individual light sources of the plurality of sets of light sources to electrically operate the individual light sources to emit near infrared light;
a plurality of electronic switches, wherein each individual electronic switch of the plurality of electronic switches is switchable between an opened state and a closed state;
an electronic control unit (ECU) comprising electronic circuitry and associated software;
wherein each individual electronic switch of the plurality of electronic switches is switched to its respective opened state responsive to a respective first signal generated by the ECU, and wherein each individual electronic switch of the plurality of electronic switches is switched to its respective closed state responsive to a respective second signal generated by the ECU;
wherein each individual electronic switch of the plurality of electronic switches (i) is connected in parallel across a respective set of light sources of the plurality of sets of light sources and (ii) is connected in series with at least one other set of light sources of the plurality of sets of light sources when at least one other electronic switch of the plurality of electronic switches is switched to its opened state;
wherein, with each individual electronic switch of the plurality of electronic switches switched to its respective opened state, electrical current provided by the current driver passes through the individual light sources of the plurality of sets of light sources;
wherein the plurality of electronic switches comprises at least (i) a first electronic switch that is connected in parallel across a first set of light sources of the plurality of sets of light sources and (i) a second electronic switch that is connected in parallel across a second set of light sources of the plurality of sets of light sources;
wherein, with the first electronic switch of the plurality of electronic switches switched to its closed state and the second electronic switch of the plurality of electronic switches switched to its opened state, electrical current bypasses the individual light sources of the first set of light sources that the first electronic switch is connected in parallel across and passes through the individual light sources of the second set of light sources that the second electronic switch is connected in parallel across;
wherein, with the interior rearview mirror assembly attached at the interior portion of the vehicle, the first set of light sources that the first electronic switch is connected in parallel across, when electrically operated to emit near infrared light, illuminates at least a driver's head region in an interior cabin of the vehicle;
wherein, with the interior rearview mirror assembly attached at the interior portion of the vehicle, the second set of light sources that the second electronic switch is connected in parallel across, when electrically operated to emit near infrared light, illuminates at least a passenger seat region of the interior cabin of the vehicle;
wherein the electronic circuitry of the ECU comprises an image processor for processing image data captured by the camera; and
wherein, with the interior rearview mirror assembly attached at the interior portion of the vehicle, the vehicular interior cabin monitoring system is (i) operable to provide an occupant detection function where image data captured by the camera is processed at the ECU for detecting an occupant present within the interior cabin of the vehicle and (ii) operable to provide a driver monitoring function where image data captured by the camera is processed at the ECU for monitoring a driver of the vehicle.

29. The vehicular interior cabin monitoring system of claim 28, wherein each individual electronic switch of the plurality of electronic switches comprises a metal-oxide-semiconductor field-effect transistor (MOSFET).

30. The vehicular interior cabin monitoring system of claim 28, wherein the current driver provides a first amperage of electrical current when the vehicular interior cabin monitoring system is operating to provide the occupant detection function, and wherein the current driver provides a second amperage of electrical current when the vehicular interior cabin monitoring system is operating to provide the driver monitoring function, and wherein the first amperage of electrical current is different than the second amperage of electrical current.

31. The vehicular interior cabin monitoring system of claim 28, wherein each individual light source of each set of light sources of the plurality of sets of light sources comprises a near infrared light emitting light emitting diode.

32. The vehicular interior cabin monitoring system of claim 28, wherein each set of light sources of the plurality of sets of light sources comprises at least two near infrared light emitting light emitting diodes.

33. The vehicular interior cabin monitoring system of claim 28, wherein each set of light sources of the plurality of sets of light sources comprises at least three near infrared light emitting light emitting diodes.

34. The vehicular interior cabin monitoring system of claim 28, wherein, with the interior rearview mirror assembly attached at the interior portion of the vehicle, and with the vehicular interior cabin monitoring system operating to provide the occupant detection function, the individual electronic switches of the plurality of electronic switches are switched to their respective opened states and the individual light sources of the plurality of sets of light sources are electrically operated to emit near infrared light.

35. The vehicular interior cabin monitoring system of claim 28, wherein the first set of light sources that the first electronic switch is connected in parallel across, when electrically operated to emit near infrared light, emits near infrared light at a first angle relative to the camera, and wherein the second set of light sources that the second electronic switch is connected in parallel across, when electrically operated to emit near infrared light, emits near infrared light at a second angle relative to the camera, and wherein the first angle is different than the second angle.

36. The vehicular interior cabin monitoring system of claim 28, wherein the second set of light sources that the second electronic switch is connected in parallel across, when electrically operated to emit near infrared light, illuminates a central region of the interior cabin of the vehicle.

37. The vehicular interior cabin monitoring system of claim 28, wherein the ECU is disposed within the mirror head.

38. The vehicular interior cabin monitoring system of claim 28, wherein the camera and the plurality of sets of light sources are disposed within the mirror head and behind the mirror reflective element, and wherein the camera views through the mirror reflective element, and wherein the plurality of sets of light sources, when electrically operated to emit near infrared light, emits near infrared light that passes through the mirror reflective element.

39. The vehicular interior cabin monitoring system of claim 28, wherein the interior portion of the vehicle comprises an in-cabin side of a windshield of the vehicle.

* * * * *